United States Patent
Sakurai et al.

(10) Patent No.: US 8,711,089 B2
(45) Date of Patent: Apr. 29, 2014

(54) POSITION DETECTION DEVICE, POINTING DEVICE AND INPUT DEVICE

(75) Inventors: Satoshi Sakurai, Shinagawa (JP);
Nobuo Yatsu, Shinagawa (JP);
Shinichiro Akieda, Shinagawa (JP);
Nobuyoshi Shimizu, Shinagawa (JP);
Keita Harada, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 1712 days.

(21) Appl. No.: 11/288,370

(22) Filed: Nov. 29, 2005

(65) Prior Publication Data

US 2006/0114221 A1 Jun. 1, 2006

(30) Foreign Application Priority Data

Nov. 29, 2004 (JP) ................................. 2004-345000
Jan. 28, 2005 (JP) ................................. 2005-020613
Jan. 28, 2005 (JP) ................................. 2005-022320

(51) Int. Cl.
*G09G 5/00* (2006.01)

(52) U.S. Cl.
USPC .......................................... 345/156; 345/157

(58) Field of Classification Search
USPC ................. 345/156–162; 324/207.11–207.24
See application file for complete search history.

(56) References Cited

U.S. PATENT DOCUMENTS

| | | | | |
|---|---|---|---|---|
| 4,810,965 A * | 3/1989 | Fujiwara et al. | ......... | 324/207.22 |
| 5,369,361 A * | 11/1994 | Wada | ......... | 324/207.2 |
| 5,606,256 A * | 2/1997 | Takei | ......... | 324/207.21 |
| 5,757,179 A * | 5/1998 | McCurley et al. | ......... | 324/207.2 |
| 5,811,969 A * | 9/1998 | Kyodo | ......... | 324/207.16 |
| 6,163,091 A * | 12/2000 | Wasson et al. | ......... | 310/12.19 |
| 6,175,233 B1 * | 1/2001 | McCurley et al. | ......... | 324/207.2 |
| 6,211,668 B1 * | 4/2001 | Duesler et al. | ......... | 324/207.2 |
| 6,552,532 B1 * | 4/2003 | Sako | ......... | 324/207.2 |
| 6,753,680 B2 * | 6/2004 | Wolf | ......... | 324/207.2 |
| 7,038,443 B2 * | 5/2006 | Proksch et al. | ......... | 324/207.18 |
| 7,151,369 B1 * | 12/2006 | Wolf | ......... | 324/207.24 |

(Continued)

FOREIGN PATENT DOCUMENTS

| | | |
|---|---|---|
| JP | 62-229002 | 10/1987 |
| JP | 63-139503 | 9/1988 |

(Continued)

OTHER PUBLICATIONS

Patent Abstracts of Japan, Publication No. 62-229002, Published Oct. 7, 1987.

(Continued)

*Primary Examiner* — Alexander Eisen
*Assistant Examiner* — Nelson Lam
(74) *Attorney, Agent, or Firm* — Staas & Halsey LLP

(57) ABSTRACT

A position detection device includes an electromagnetic conversion element and a magnetic field generator. The electromagnetic conversion element is arranged on a given plane. The magnetic field generator is arranged facing one side of the electromagnetic conversion element in a direction vertical to the given plane and generates a magnetic field covering the electromagnetic conversion element. A relative position between the electromagnetic conversion element and the magnetic field generator is detected when a relative displacement parallel to the given plane is made by the electromagnetic conversion element and the magnetic field generator based on an output signal of the electromagnetic conversion element. The magnetic field generator has an opposed face that tilts to the electromagnetic conversion element, and generates the magnetic field from the opposed face.

9 Claims, 39 Drawing Sheets

(56) References Cited

U.S. PATENT DOCUMENTS

| | | |
|---|---|---|
| 7,521,922 B2 * | 4/2009 | Stuve .......................... 324/207.2 |
| 2003/0112006 A1 | 6/2003 | Luetzow |
| 2004/0000902 A1 * | 1/2004 | Tokunaga et al. .......... 324/207.2 |
| 2004/0189287 A1 * | 9/2004 | Suzuki et al. ............ 324/207.24 |
| 2004/0239313 A1 * | 12/2004 | Godkin ...................... 324/207.2 |
| 2005/0021207 A1 * | 1/2005 | Endo et al. ...................... 701/49 |
| 2005/0134261 A1 * | 6/2005 | Schaefer ........................ 324/260 |
| 2005/0218727 A1 * | 10/2005 | Gandel et al. .................... 310/12 |
| 2006/0055259 A1 * | 3/2006 | Hanlon et al. ............... 310/90.5 |

FOREIGN PATENT DOCUMENTS

| | | |
|---|---|---|
| JP | 64-009302 | 1/1989 |
| JP | 2-131614 | 11/1990 |
| JP | 3-102703 | 10/1991 |
| JP | 7-49549 | 11/1995 |
| JP | 08-105706 | 4/1996 |
| JP | 2000-180114 | 6/2000 |
| JP | 2002-149337 | 5/2002 |

OTHER PUBLICATIONS

Patent Abstracts of Japan, Publication No. 64-009302, Published Jan. 1, 1989.
Patent Abstracts of Japan, Publication No. 08-105706, Published Apr. 23, 1996.
Japanese Patent Office Action dated Apr. 6, 2010 in corresponding Japanese Application No. 2004-345000.
Feb. 10, 2012 Office Action in U.S. Appl. No. 13/067,070, a pending divisional of the above-referenced application.
Jul. 2, 2012 Office Action in U.S. Appl. No. 13/067,070, a pending divisional of the above-referenced application.
Nov. 6, 2012 Office Action in U.S. Appl. No. 13/067,070, a pending divisional of the above-referenced application.
Notification of Reason(s) for Refusal.
Jun. 20, 2013 Office Action in U.S. Appl. No. 13/067,070, a pending divisional of the above-referenced application.
Notice of Allowance issued Dec. 4, 2013 in co-pending U.S. Appl. No. 13/067,070.

* cited by examiner

FIG. 27A
FIG. 27B
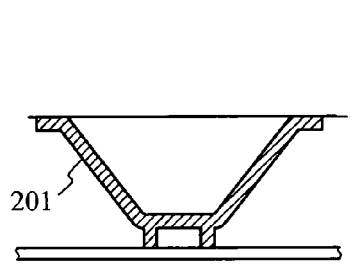
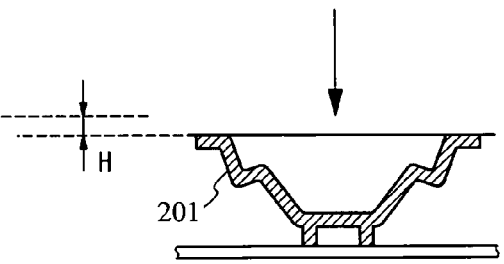

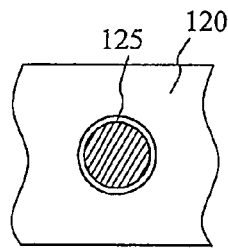
FIG. 38A 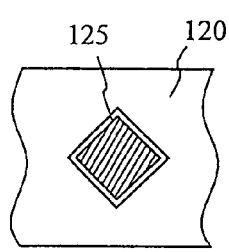 FIG. 38B 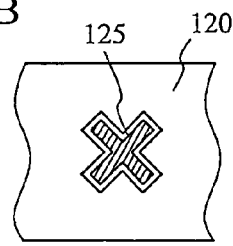
FIG. 38C 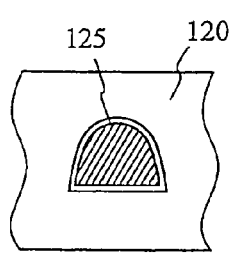 FIG. 38D 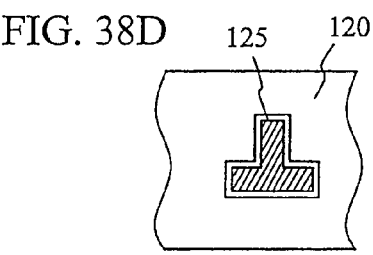

POSITION DETECTION DEVICE, POINTING DEVICE AND INPUT DEVICE

BACKGROUND OF THE INVENTION

1. Field of the Invention

This invention generally relates to a non-contact position detection device, and in particular, relates to a device which detects a position by detecting a magnetic field generated from a magnet with an electromagnetic conversion element. In addition, this invention generally relates to a pointing device which is connected to an information processing apparatus such as a personal computer, a PDA, a cellular phone, a navigation system or the like to be used when position information or direction information are input, and in particular, relates to a pointing device which is capable of determining or settling an input. Further, this invention relates to an input device used to input an instruction into a personal computer or the like, and in particular, relates to an input device having a structure in which an operation portion operated by an operator during an operation is retained stably.

2. Description of the Related Art

Conventionally, a position detection device is used generally in an electronics device or an electronics apparatus. The position detection device is mounted, for example, as a part of an input device of a computer, and is used for a device which determines a pointing position when an operator moves an operation element. In addition, the position detection device is mounted on a movable body such as a car, and is used for monitoring a position of the movable body.

The position detection device generally has a fixed part and a movable part moving relatively to the fixed part, and detects a change of position of the movable part by using a change of a light or a magnetic field (magnetic flux density). Japanese Patent Application Publication No. 2000-180114 (hereinafter referred to as Document 1) discloses, for example, a non-contact position detection device using a magnet. In the position detection device, two magnets are arranged at a fixed interval, and an electromagnetic conversion element is arranged between the two magnets. The magnets respectively arranged above and below form a diamond-shaped space in which a gap range at the middle thereof is larger than a range at the periphery thereof. The electromagnetic conversion element is arranged in the afore-mentioned space. The position detection device detects a position using a signal from the electromagnetic conversion element when either the magnet or the electromagnetic conversion element moves.

In addition, a pointing device is connected to a computer or the like, outputs the position information or the direction information, and is used in order to move a pointer or a cursor displayed on a display to a desirable position. The pointing device may be a more convenient one if the pointing device is capable of outputting a signal to select an icon displayed at the position together.

Japanese Utility Model Application Publication No. 7-49549 (hereinafter referred to as Document 2) discloses a pointing device having a structure in which an input button is arranged under a track ball. In addition, Japanese Patent Application Publication No. 2002-149337 (hereinafter referred to as Document 3) discloses a pointing device which has an operation portion moving on an X-Y plane. A switch is provided under the operation portion.

Further, another input device, which inputs an instruction using the position information of a movable object that an operator moves, has been known. The input device includes an operation portion which is moved by an operator's operation, and points a desirable position with the position of the operation portion. The input device is connected to a computer or the like. An operator moves the operation position and determines a pointing position on a display.

Document 3 discloses a pointing device to be connected to a computer. The pointing device has a position information input portion corresponding to the operation portion. When the pointing device slides, a pointer or a cursor displayed on a display, to which the pointing device is connected, moves in a corresponding direction.

In the position detection device disclosed in Document 1, however, at least one pair of magnets are arranged above and below facing each other, and the magnets form the diamond-shaped space. Therefore, there is a problem in that the production costs increase because of its complex structure around the electromagnetic conversion element. In addition, the position detection device has only one electromagnetic conversion element in the above-mentioned space. It is thus necessary to identify the position of the magnet on a two-dimensional plane by using an output signal from one electromagnetic conversion element. Accordingly, there are other problems that a signal processing is complicated and an accuracy of the position detection is reduced.

In addition, the thickness of the pointing device described in Document 2 is increased, because a portion that an operator operates has a ball shape. If the size of the ball is reduced in order to downsize the input device, the input device is difficult to operate. In the pointing device described in Document 3, the switch provided under the device is turned on when the operation portion is pressed. Hence, it is necessary to retain the operation portion on the switch in order to press down the switch. It is also necessary to move the operation portion in a region where the switch is provided. This switch mechanism may be provided in the operation portion. However, in this case, it is necessary to form a space to house the switch, interconnections, and so on in the operation portion. And, the structure is complicated and grows in size. This arises a problem that an operational feeling gets worse and the interconnection to the switch is easy to be cut off, because the interconnection is moved according to the movement of the operation portion.

Further, in the pointing device disclosed in Document 3, the range is narrow so that the position information input portion (the operation portion) can move. In such a narrow range, it is difficult to point an accurate position, because a pointer on the display moves rapidly, even if the operation portion moves just a little. It is thus preferable that the input device having the operation portion should be provided in a relatively large area so that the operation portion may move in the area. However, in this case, there is a problem that the operation portion moves unstably when it is not used, for example, when an instruction is not input or while the input device is being moved.

SUMMARY OF THE INVENTION

The present invention has an object to provide a position detection device having a simple structure and being capable of detecting a position accurately. In addition, the present invention has another object to provide a pointing device having a simple structure and being capable of pointing and of settling an input. Further, the present invention has yet another object to provide an input device having a structure in which the operation portion is retained stably while the instruction is not being input.

According to an aspect of the present invention, preferably, there is provided a position detection device including an electromagnetic conversion element and a magnetic field generator. The electromagnetic conversion element is arranged on a given plane. The magnetic field generator is arranged facing one side of the electromagnetic conversion element in a direction vertical to the given plane and generates a magnetic field covering the electromagnetic conversion element. A relative position between the electromagnetic conversion element and the magnetic field generator is detected when a relative displacement parallel to the given plane is made by the electromagnetic conversion element and the magnetic field generator based on an output signal of the electromagnetic conversion element. The magnetic field generator has an opposed face that tilts to the electromagnetic conversion element, and generates the magnetic field from the opposed face.

According to another aspect of the present invention, preferably, there is provided a pointing device including two position detection portions, an operation portion, and an input determination mechanism. The two position detection portions have an electromagnetic conversion element and a magnetic field generator, the electromagnetic conversion element being arranged on a given plane, the magnetic field generator being opposed to the electromagnetic conversion element and having an opposed face tilting to the given plane. The two position detection portions are respectively arranged on two axes crossed at right angles to each other and detect a relative position between the electromagnetic conversion element and the magnetic field generator when the electromagnetic conversion element moves in parallel with the given plane relative to the magnetic field generator based on an output signal of the electromagnetic conversion element. The operation portion is located to move on a plane having the two axes. The input determination mechanism is provided to determine or settle an input when the operation portion is pressed down. Either the electromagnetic conversion element or the magnetic field generator moves in parallel with the given plane when the operation portion moves.

According to another aspect of the present invention, preferably, there is provided an input device including a position detection portion, movable object, a retaining member and a friction generator. The position detection portion has an electromagnetic conversion element and a magnetic field generator, the electromagnetic conversion element being arranged on a given plane, the magnetic field generator being opposed to the electromagnetic conversion element and having an opposed face tilting to the given plane. The position detection portion detects a relative position between the electromagnetic conversion element and the magnetic field generator, when the electromagnetic conversion element moves in parallel with the given plane relative to the magnetic field generator based on an output signal of the electromagnetic conversion element. The movable object moves either the electromagnetic conversion element or the magnetic field generator in parallel with the given plane. The retaining member retains the movable object to be capable of reciprocating. The friction generator generates a frictional force retaining the movable object at a fixed position of the retaining member.

In accordance with the present invention, the friction generator, which generates a frictional force retaining the movable object at a fixed position of the retaining member. It is possible to control the movement of the movable object, even while the operator is not operating. The frictional force does not generate an excessive load and does not effect the operation while the operator is operating. On the other hand, the frictional force is adjusted so as to prevent the movement of the movable object if the input device is moved while not being used.

BRIEF DESCRIPTION OF THE DRAWINGS

Preferred embodiments of the present invention will be described in detail with reference to the following drawings, wherein:

FIG. 2A illustrates a case where an electromagnetic conversion element is at the left hand where the range between a leading yoke and an opposed face is narrow, FIG. 2B illustrates a case where an electromagnetic conversion element is at the right hand where the range between a leading yoke and the opposed face is wide, FIG. 2C illustrates a side view corresponding to FIG. 2A, and FIG. 2D illustrates a side view corresponding to FIG. 2B;

FIG. 27A and FIG. 27B illustrate cases where a rubber member is buckled when an input operation shaft is pressed;

FIG. 38A through FIG. 38E illustrate variations of cross sectional shape of a guide shaft.

DESCRIPTION OF THE PREFERRED EMBODIMENTS

A description will now be given, with reference to the accompanying drawings, of embodiments of the present invention.

First Embodiment

Figure 1:
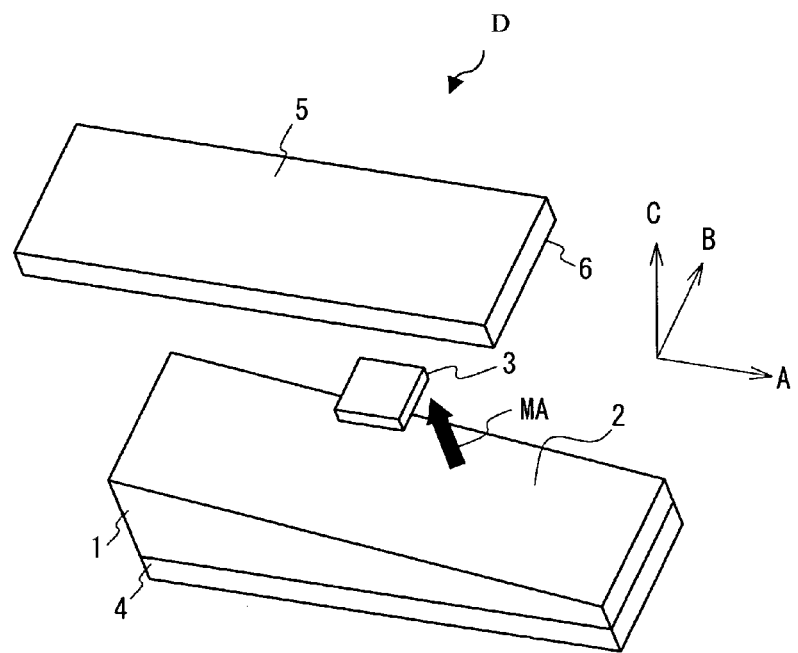
FIG. 1 illustrates an enlarged view of a sensor portion, which is a principle portion of a position detection device.

FIG. 1 illustrates an enlarged view of a sensor portion D, which is a principle portion of a position detection device. The sensor portion D has at least a magnet 1 serving as a magnetic field generator and an electromagnetic conversion element 3. The electromagnetic conversion element is arranged on a given plane. As is shown in FIG. 1, if three axes A, B and C are provided to be virtually crossed at right angles to each other, the electromagnetic conversion element 3 is arranged, for example, on an A-B plane at a given level in a C-axis direction. The magnet 1 is arranged to face one side of the electromagnetic conversion element 3 in a direction vertical to the A-B plane. A face 2 (hereinafter referred to as an opposed face 2) at one side of the magnet 1 facing the electromagnetic conversion element 3 is a plane tilting linearly. Specifically, the magnet 1 has a rectangular shape, when it is projected on the A-B plane, and the magnet 1 is arranged in such a manner that a longer side thereof is arranged in parallel with an A-axis direction. The opposed face 2 is a face tilting linearly along the A-axis direction. In the aforementioned structure, a distance between the magnet 1 and the electromagnetic conversion element 3 changes substantially linearly. The thickness (wall thickness in a C-axis direction) of the magnet 1 shown in FIG. 1 sequentially changes along the A-axis direction. A magnetic field MA vertical to the A-B plane is generated from the opposed face 2 toward the electromagnetic conversion element 3.

In FIG. 1, a yoke 5 having a square pole shape is arranged at the upper side (opposed side of the magnet 1) of the electromagnetic conversion element 3, as a preferred structure in accordance with the invention. The yoke 5 is arranged to face the magnet 1, and the electromagnetic conversion element 3 is arranged between the yoke 5 and the magnet 1. The yoke 5 is arranged in parallel with the electromagnetic conversion element 3, that is, a lower face 6 of the yoke 5 is arranged in parallel with the A-B plane. The yoke 5 acts to induce the magnetic field MA so that the magnetic field MA is vertical to the electromagnetic conversion element 3. Hereinafter, the yoke 5 is referred to as an inducing yoke 5.

In addition, in a preferred structure, a yoke 4 having a square pole shape is connected to a lower face of the magnet 1. The yoke 4 serves to suppress the leaks from the magnetic field generated by the magnet 1. Hereinafter, the yoke 4 is referred to as a first yoke 4. The first yoke 4 may be arranged separately from the lower face of the magnet 1, although it is more effective that the first yoke 4 is arranged in touch with the lower face as is shown in FIG. 1. The magnet 1 mentioned above may be either a permanent magnet or an electromagnet. Further, a hall element, a magnetoresistance effect element (MR element) or the like may be employed for the electromagnetic conversion element 3 mentioned above.

Figure 2A:
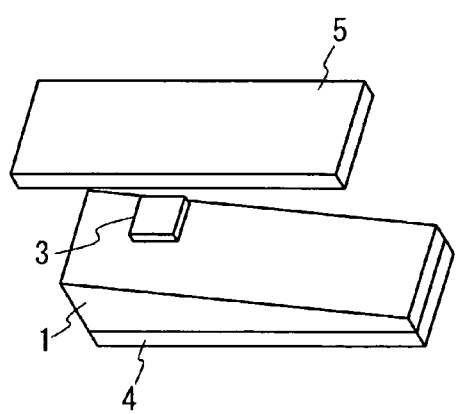
FIG. 2A through 2D schematically illustrate cases where an electromagnetic conversion element moves.
Figure 2B:
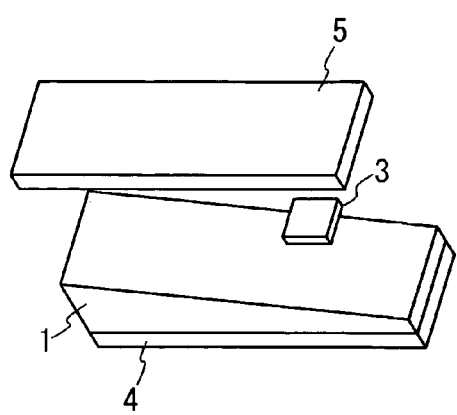
Figure 2C:
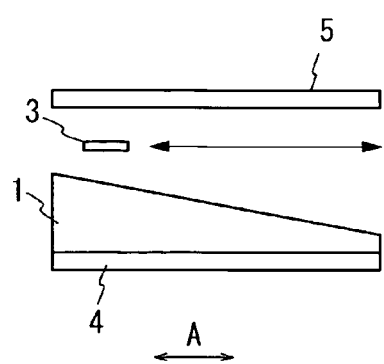
Figure 2D:
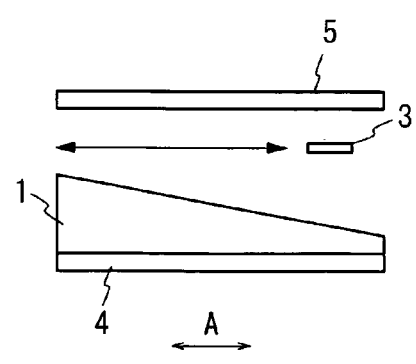

A signal (a voltage based on a magnetic field intensity) is output from the electromagnetic conversion element 3 when the magnet 1 and the electromagnetic conversion element 3 shown in FIG. 1 move relatively in the A-axis direction. It should be appreciated that the electromagnetic conversion element 3 may be fixed and the magnet 1 moves along the A-axis direction. Also, the magnet 1 may be fixed and the electromagnetic conversion element 3 moves along the A-axis direction. FIGS. 2A through 2D schematically illustrate cases where the electromagnetic conversion element 3 moves. FIG. 2A illustrates a case where the electromagnetic conversion element 3 is arranged at the left hand where a range between the inducing yoke 5 and the opposed face 2 is narrow. FIG. 2B illustrates another case where the electromagnetic conversion element 3 is arranged at the right hand where the range between the inducing yoke 5 and the opposed face 2 is wide. In addition, FIG. 2C illustrates a side view corresponding to FIG. 2A, and FIG. 2D illustrates a side view corresponding to FIG. 2B.

Figure 3:
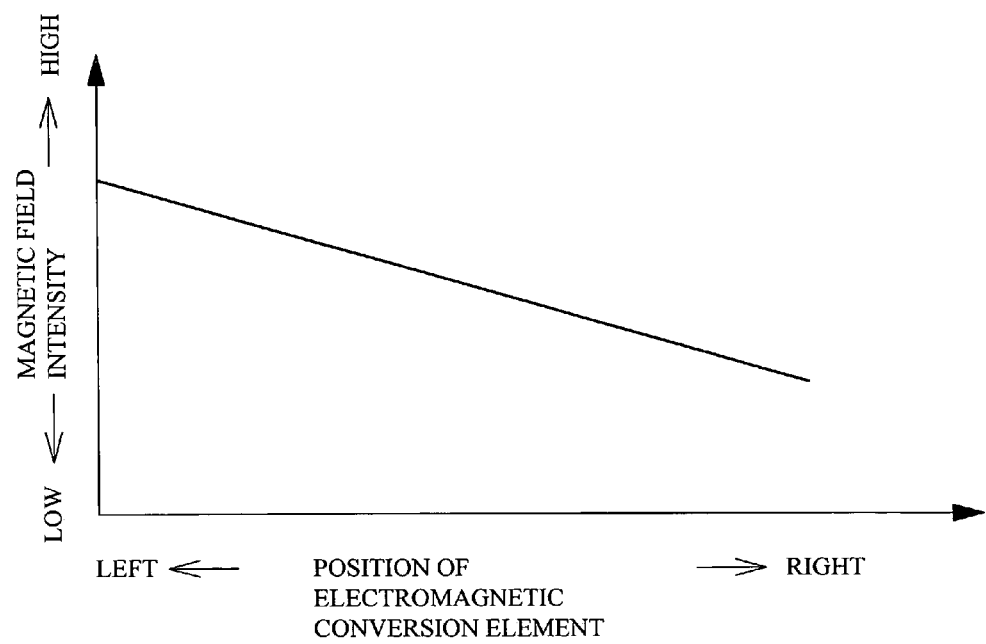
FIG. 3 illustrates a magnetic field generated between a leading yoke and an opposed face.

In the case shown in FIG. 2A and FIG. 2C, the magnetic field received by the electromagnetic conversion element 3 is relatively large (the magnetic flux density is high). In contrast, in the case shown in FIG. 2B and FIG. 2D, the magnetic field received by the electromagnetic conversion element 3 is relatively small (the magnetic flux density is low). The magnetic field between the inducing yoke 5 and the opposed face 2 changes continuously as is shown in FIG. 3. It is therefore possible to obtain a linear output signal from the electromagnetic conversion element 3 when the electromagnetic conversion element 3 moves within the ranges shown in FIG. 2A and FIG. 2B. Accordingly, it is possible to detect the position of the electromagnetic conversion element 3 in the A-axis direction, based on the output signal.

Figure 4:
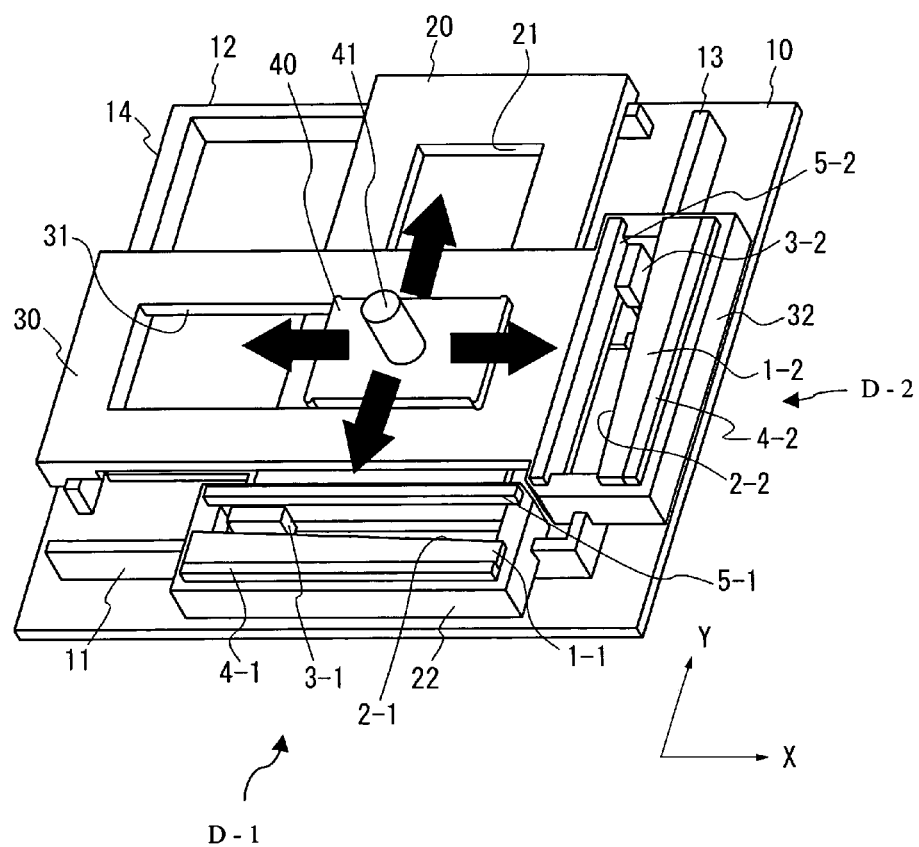
FIG. 4 illustrates a mechanical overall view of a position detection device in accordance with a first embodiment.

FIG. 4 illustrates a mechanical overall view of the position detection device. The position detection device shown in FIG. 4 has two sensor portions D shown in FIG. 1. The same components as those shown in FIG. 1 have the same reference numerals in order to avoid a duplicated explanation. In addition, there are provided two sensor portions D, and additional numerals (-1, -2) are employed for the sensor portions D respectively to distinguish them. Further, in FIG. 4, a description will be given using two axes, X-axis and Y-axis, virtually crossed at right angles to each other.

The position detection device has a structure in which a mechanical structure is mounted on a printed board 10. The position detection device has a first slider 20 being capable of moving along the X-axis direction and a second slider 30 being capable of moving along the Y-axis direction. The first slider 20 is guided by a pair of rails 11 and 12 provided respectively at the upper side and the lower side of the board 10, and the second slider 30 is guided by a pair of rails 13 and 14 provided respectively at the right side and the left side of the board 10.

The first slider 20 has a substantially rectangular shape, and has an elongate hole 21 formed at the middle thereof and a support frame 22 projecting toward one end thereof. A movable object 40 serving as an operating element is engaged in the elongate hole 21. A projection 41 for operation is provided on the movable object 40. An operator moves the movable object 40 to a desirable position by operating the projection 41. The support frame 22 supports a magnet 1-1, a first yoke 4-1 and an inducing yoke 5-1 that form a first sensor portion D-1. An electromagnetic conversion element 3-1 arranged between the magnet 1-1 and the inducing yoke 5-1 is secured at a fixed position of the board 10 (lower side of the board 10 and center in a left-and-right direction). An opposed face 2-1 of the magnet 1-1 tilts linearly along the X-axis direction, along which the first slider 20 moves. In particular, the thickness of the magnet 1-1 is reduced from the left side to the right side in the X-axis.

The second slider 30 is arranged on the first slider 20 and crossed with the first slider 20 at right angles. The second slider 30 has a same configuration as that of the first slider 20. That is, the second slider 30 has an elongate hole 31 formed at the middle thereof and a support frame 32 projecting toward one end thereof. The movable object 40 serving as an operating element is engaged with the elongate hole 31. The support frame 32 supports a magnet 1-2, a first yoke 4-2 and an inducing yoke 5-2 that form a second sensor portion D-2. An electromagnetic conversion element 3-2 arranged between the magnet 1-2 and the inducing yoke 5-2 is secured at a fixed position of the board 10 (on the right side of the board 10 and in the middle in an up-and-down direction).

The movable object 40 is engaged with the elongate hole 21 of the first slider 20 and the elongate hole 31 of the second slider 30. Therefore, when an operator moves the movable object 40, the first slider 20 and the second slider 30 moves, the magnet 1-1 moves along the X-axis direction, and the magnet 1-2 moves along the Y-axis direction. Accordingly, the electromagnetic conversion elements 3-1 and 3-2 respectively arranged on the two axes output an output signal based on the position of the movable object 40. It is thus possible to detect the position of the movable object 40 on the X-Y plane.

Figure 5:
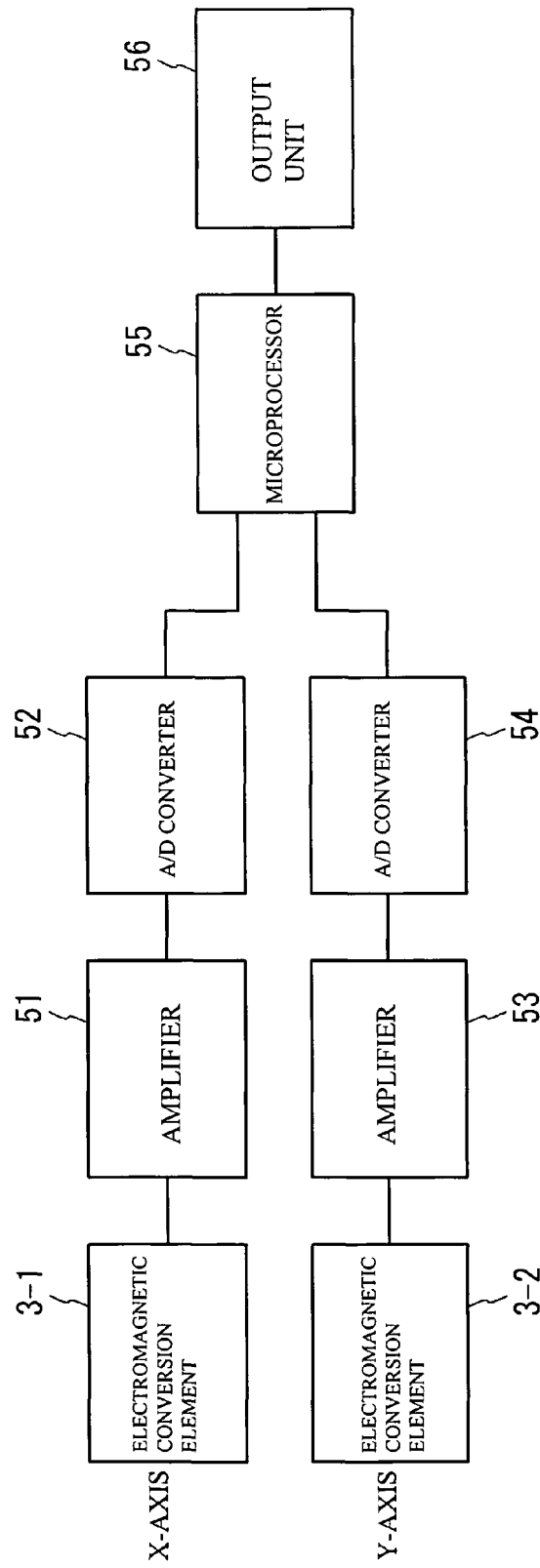
FIG. 5 illustrates a block diagram of electronic configuration of a position detection device shown in FIG. 4.

FIG. 5 illustrates a block diagram of electric configuration of the position detection device shown in FIG. 4. The electric configuration shown in FIG. 5 may be arranged on the board 10 shown in FIG. 4. The electromagnetic conversion element 3-1 detecting a position in the X-axis direction converts a magnetic field intensity into a voltage, and outputs the voltage. An amplifier 51 amplifies the voltage. An A/D converter 52 converts an analog signal amplified by the amplifier 51 into a digital signal. Similarly, the electromagnetic conversion element 3-2 detecting position in the Y-axis direction converts a magnetic field intensity into a voltage, and outputs the voltage. An amplifier 53 amplifies the voltage and provides the amplified voltage to an A/D converter 54. The A/D converter 54 converts an analog signal into a digital signal.

A microprocessor 55 is mainly constructed of CPU. The microprocessor 55 calculates an X-Y coordinate value based on the digital signal applied from the A/D converter 52 provided at the X-axis side and that applied from the A/D converter 54 provided at the Y-axis side. The microprocessor 55 outputs the calculated data to an external device such as a computer through an output unit 56.

The above-mentioned position detection device in accordance with the first embodiment of the present invention has a simple construction, in which the magnet 1 is arranged to face one side of the electromagnetic conversion element 3 and the opposed face 2 of the magnet 1 providing a magnetic field toward the electromagnetic conversion element 3 has a plate shape and tilts linearly. It is thus possible to produce the position detection device in accordance with the first embodiment at low cost. In addition, the above-mentioned position detection device detects a position by arranging two sensor portions respectively on two axes crossed at right angles to each other, making it possible to simplify the structure and detect the position accurately.

Further description will be given in accordance with other embodiments of the invention. However, the mechanical configuration and electrical configuration of the following embodiments are the same as those of FIG. 4 and FIG. 5 illustrating the position detection device in accordance with the first embodiment, yet a sensor portion D having the magnet 1 and the electromagnetic conversion element 3 in accordance with the following embodiments are different from that described in the first embodiment. A description will be given of the following embodiments, with reference to drawings of the sensor portion D. In addition, the same components and configurations as those of the first embodiment have the same reference numerals in order to avoid a duplicated explanation.

Second Embodiment

In the sensor portion D of the position detection device in accordance with a second embodiment of the present invention, the opposed face 2 of the magnet 1 facing the electromagnetic conversion element 3 has another shape. FIG. 6A through 6D illustrate the sensor portion D of the position detection device in accordance with the second embodiment. FIG. 6A through FIG. 6D show illustrative variations of the opposed face 2 of the magnet 1. Although the opposed face 2 of the magnet 1 in accordance with the first embodiment has a plate shape tilting linearly in a direction of the relative displacement of the magnet 1 and the electromagnetic conversion element 3, the opposed face in accordance with the second embodiment has a curved surface. A magnetic field disturbance might exist at the position where the electromagnetic conversion element 3 is arranged. As is shown in FIG. 6, it is possible to correct the output of the electromagnetic conversion element 3 to be linearized by curving the opposed face 2.

Figure 6A:
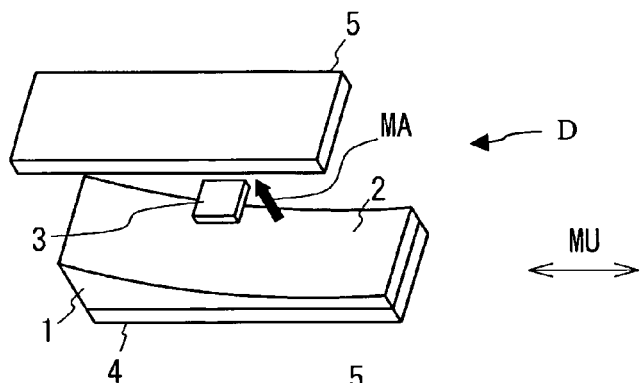
FIG. 6A through FIG. 6D illustrate a sensor portion of a position detection device in accordance with a second embodiment.
Figure 6B:
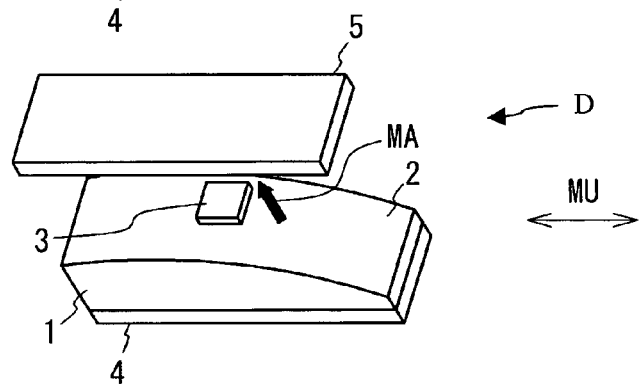

The opposed face 2 shown in FIG. 6A tilts to the electromagnetic conversion element 3, and is formed to be curved concavely, in a direction in parallel with a relative displacement direction MU of the magnet 1 and the electromagnetic conversion element 3. The opposed face 2 shown in FIG. 6B tilts to the electromagnetic conversion element 3, and is formed to be curved convexly, in the relative displacement direction MU of the magnet 1 and the electromagnetic conversion element 3.

Figure 6C:
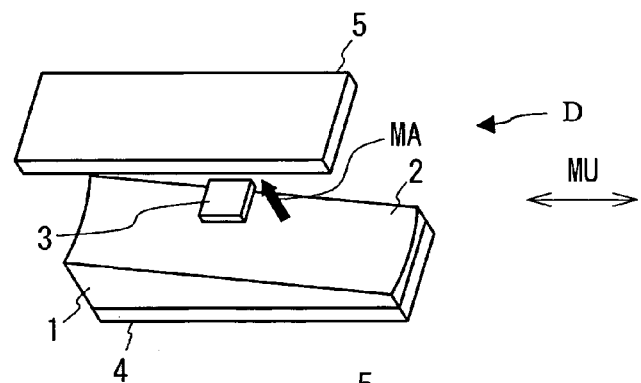
Figure 6D:
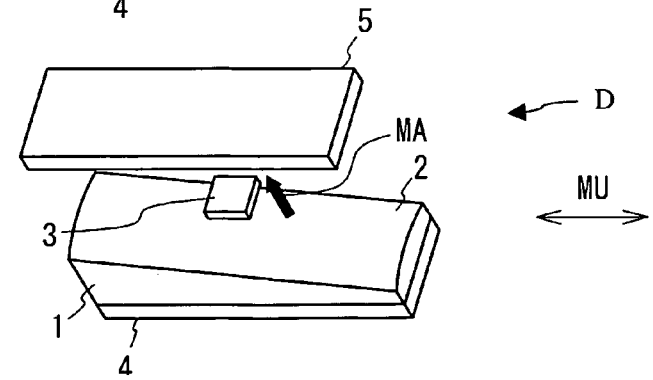

The opposed face 2 shown in FIG. 6C tilts linearly to the electromagnetic conversion element 3 in the relative displacement direction MU of the magnet 1 and the electromagnetic conversion element 3, and is formed to be curved concavely in a direction vertical to the relative displacement direction MU. In addition, the opposed face 2 shown in FIG. 6D tilts linearly to the electromagnetic conversion element 3 in the relative displacement direction MU of the magnet 1 and the electromagnetic conversion element 3, and is formed to be curved convexly in a direction vertical to the relative displacement direction MU.

The opposed face 2 shown in FIG. 6 is an example. The opposed face 2 may have both a convexly curved plate shape and a concavely curved plate shape so that an output from the electromagnetic conversion element 3 is linear. In addition, either the inducing yoke 5 or the first yoke 4 or both of those may be omitted, although configuration examples are illustrated in FIG. 6A through FIG. 6D, as preferred ones of the invention in which the inducing yoke 5 and the first yoke 4 are arranged. Further, the first yoke 4 may be arranged separately from the magnet 1. In accordance with the position detection device of the second embodiment, it is possible to obtain a linear output, even though the electromagnetic conversion element 3 is affected by the magnetic field disturbance, enabling the position to be detected accurately.

Third Embodiment

In the first embodiment and the second embodiment mentioned above, the opposed face 2 tilts based on the changing thickness of the magnet 1. In the sensor portion D of the position detection device in accordance with a third embodiment, the opposed face 2 is made to tilt by changing the thickness of the first yoke 4 provided under the magnet 1. FIG. 7A through FIG. 7E illustrate the sensor portion D included in the position detection device in accordance with the third embodiment. FIG. 7A through FIG. 7E show illustrative variations in which the opposed face 2 tilts based on the changing thickness of the yoke 4, and then the shape of the opposed face 2 is changed.

Figure 7A:
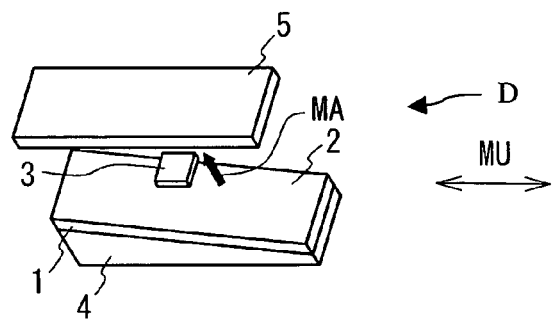
FIG. 7A through FIG. 7E illustrate a sensor portion of a position detection device in accordance with a third embodiment.
Figure 7B:
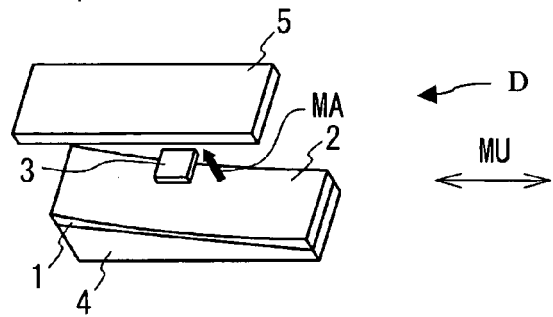
Figure 7C:
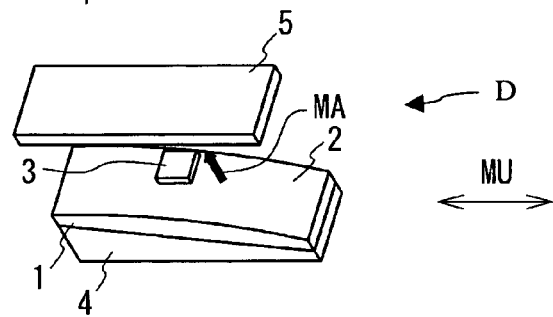

The structure example shown in FIG. 7A corresponds to the structure in accordance with the first embodiment. The thickness of the first yoke 4 changes in parallel with the relative displacement direction MU of the magnet 1 and the electromagnetic conversion element 3. Accordingly, the opposed face 2 having a plane surface of the magnet 1 tilts.

FIG. 7B through FIG. 7E show structure examples corresponding to FIG. 6A through FIG. 6D in accordance with the second embodiment. The opposed face 2 shown in FIG. 7B tilts to the electromagnetic conversion element 3 in parallel with the relative displacement direction MU of the magnet 1 and the electromagnetic conversion element 3, and is formed to be curved concavely. The opposed face 2 shown in FIG. 7C tilts to the electromagnetic conversion element 3 in the relative displacement direction MU of the magnet 1 and the electromagnetic conversion element 3, and is formed to be curved convexly.

Figure 7D:
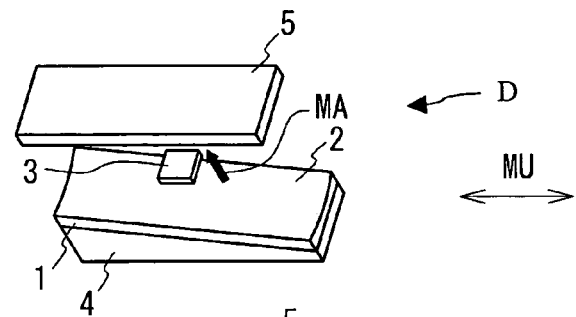
Figure 7E:
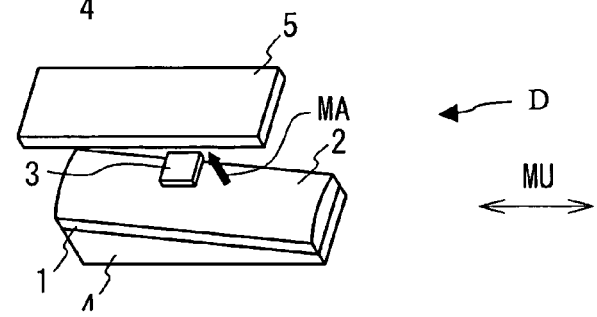

The opposed face 2 shown in FIG. 7D tilts linearly to the electromagnetic conversion element 3 in the relative displacement direction MU of the magnet 1 and the electromagnetic conversion element 3, and is formed to be curved concavely in a direction vertical to the relative displacement direction MU. In addition, the opposed face 2 shown in FIG. 7E tilts linearly to the electromagnetic conversion element 3 in the direction MU of the relative displacement of the magnet 1 and the electromagnetic conversion element 3, and is formed to be curved convexly in the direction vertical to the relative displacement direction MU.

The position detection device having the sensor portion D shown in FIG. 7A has the same effect as that of the first embodiment. The position detection device having the sensor portion D shown in FIG. 7B through FIG. 7E has the same effect as that of the second embodiment. In addition, the shapes of the opposed face 2 included in the magnet 1 are shown in FIG. 7B through FIG. 7E as examples. The opposed face 2 may have a combination shape of convexly curved plate and concavely curved plate so that the output from the electromagnetic conversion element 3 is linearized. In addition, either the inducing yoke 5 or the first yoke 4 or both of those may be omitted, although those structure examples show both the inducing yoke 5 and the first yoke 4. Further, the first yoke 4 may be separately arranged from the magnet 1.

Fourth Embodiment

In the first embodiment through the third embodiment mentioned above, the magnet 1 is arranged to face the electromagnetic conversion element 3 and the magnet 1 has the opposed face 2. In the sensor portion D in accordance with a fourth embodiment to be described below, the first yoke 4 is provided on the magnet 1 and on one side of the electromagnetic conversion element 3. And the first yoke 4 has an opposed face 7. Even though the first yoke 4 is arranged at the side of the electromagnetic conversion element 3, the sensor portion D has the same effect as those of embodiments mentioned above.

Figure 8A:
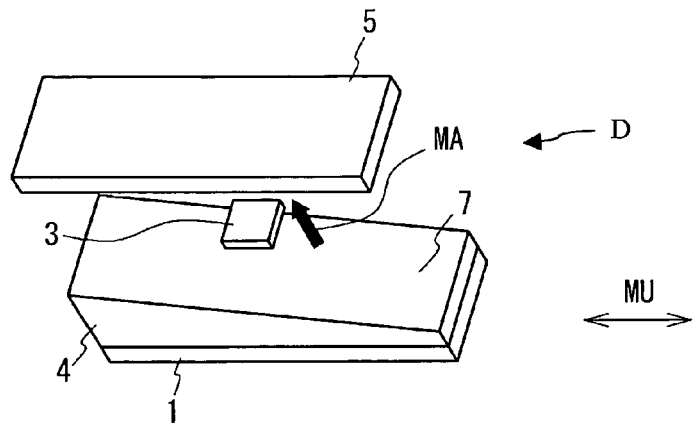
FIG. 8A through FIG. 8C illustrate a sensor portion of a position detection device in accordance with a fourth embodiment.

The structure example shown FIG. 8A corresponds to the structure in accordance with the first embodiment. The opposed face 7 having a plane surface is formed on the yoke 4, and tilts in parallel with the relative displacement direction MU based on the changing thickness of the first yoke 4. In addition, it may be configured in such a manner that the first yoke 4 has a planate shape and the opposed face 7 tilts in the relative displacement direction MU based on the changing thickness of the magnet 1. Further, the magnet 1 may be formed separately from the first yoke 4.

Figure 8B:
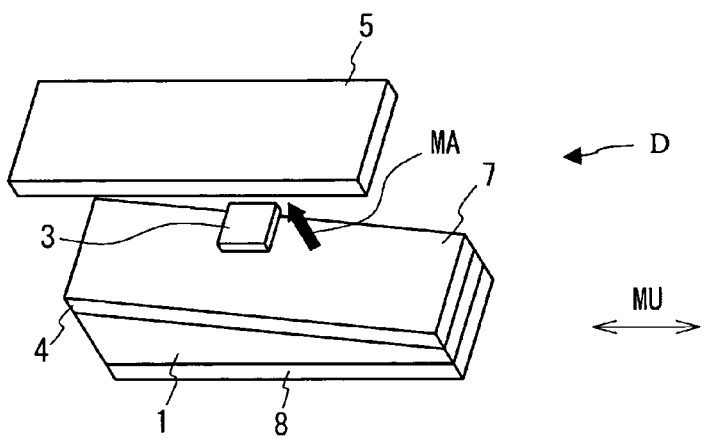
Figure 8C:
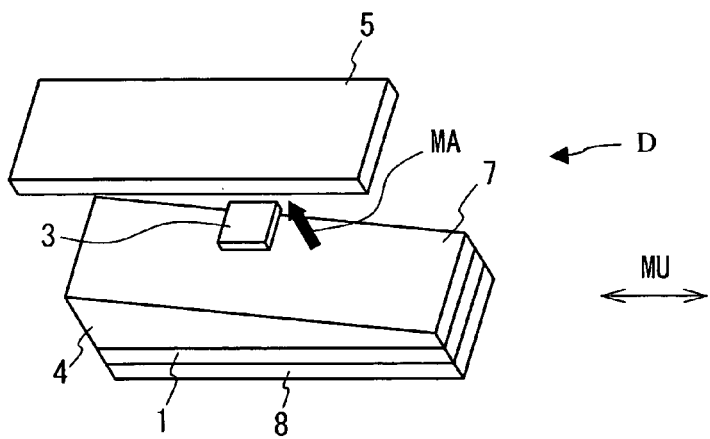

FIG. 8B illustrates a variation example based on the sensor portion D shown in FIG. 8A. In the sensor portion D shown in FIG. 8B, the first yoke 4 has a plate shape and the opposed face 7 tilts in parallel with the relative displacement direction MU based on the changing thickness of the magnet 1. And, a second yoke 8 is provided on the lower face of the magnet 1. FIG. 8C also illustrates another variation example based on the sensor portion D shown in FIG. 8A. In the sensor portion D in FIG. 8C, the second yoke 8 is provided on the lower face of the magnet 1. It may be configured in such a manner that the opposed face 7 tilts in parallel with the relative displacement direction MU based on the changing thickness of the first yoke 4 and the second yoke 8, as yet another variation example based on the sensor portion D shown in FIG. 8C.

In addition, the opposed face 7 may have a curved surface as well as the opposed face 2 shown in FIG. 6, although the opposed face 7 is not shown in FIG. 8A through 8C. Further, in FIG. 8A through FIG. 8C, the first yoke 4 is a member to provide the magnetic field MA to the electromagnetic conversion element 3. And, the second yoke 8 added in FIG. 8B and FIG. 8C is a member to suppress the leaks of the magnetic field.

Fifth Embodiment

In the first embodiment through the fourth embodiment mentioned above, the opposed face 2 or the opposed face 7 tilts based on the changing thickness of the magnet 1, the first yoke 4 or the second yoke 8. In the following sensor portion D in accordance with a fifth embodiment, the magnet 1 and a yoke provided on the side of the magnet 1 have plate shapes and are arranged to tilt, and the opposed face tilts to the electromagnetic conversion element 3. The sensor portion D in accordance with the fifth embodiment has a most simple structure, and it is possible to produce the sensor portion D at low cost. The sensor portion D in accordance with the fifth embodiment has the same effect as those of the embodiments mentioned above.

Figure 9A:
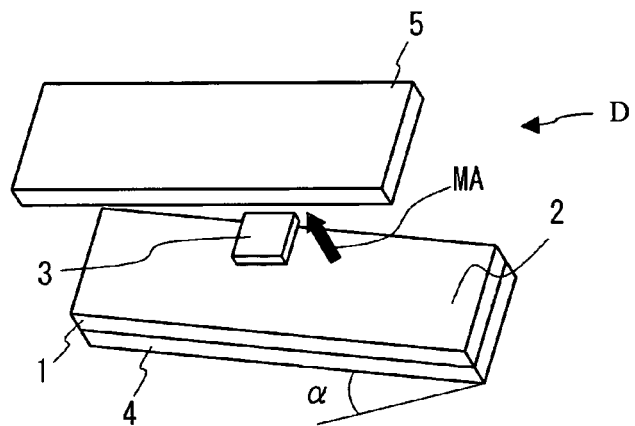
FIG. 9A and FIG. 9B illustrate a sensor portion of a position detection device in accordance with a sixth embodiment.
Figure 9B:
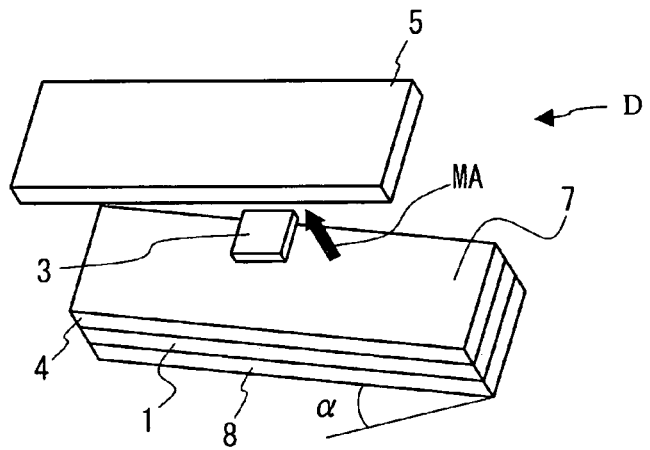

The configuration example shown in FIG. 9A corresponds to that of the first embodiment. The magnet 1 and the first yoke 4 having a plate shape tilt by a degree in parallel with a direction of the relative displacement direction MU. As a variation example, the first yoke 4 may be provided on the magnet 1 and at a side of the electromagnetic conversion element 3. In addition, the magnet 1 may be arranged separately from the first yoke 4. FIG. 9B illustrates a variation example based on the sensor portion D shown in FIG. 9A. In the sensor portion D shown in FIG. 9B, the first yoke 4 is arranged on the upper face of the magnet 1 and the yoke 4 has the opposed face 7. Also, the second yoke 8 is provided on the lower face of the magnet 1. In addition, the opposed face 2 or the opposed face 7 has a curved surface as well as the opposed face 2 shown in FIG. 6, which is not shown.

Sixth Embodiment

Figure 10A:
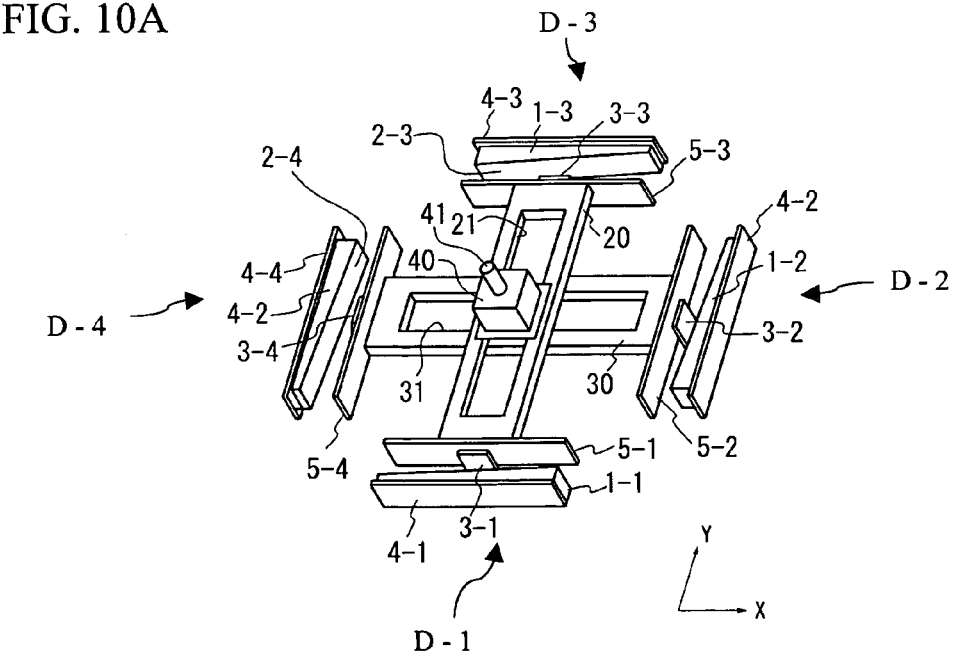
FIG. 10A through FIG. 10C illustrate a mechanical overall view of a position detection device in accordance with a sixth embodiment.
Figure 10B:
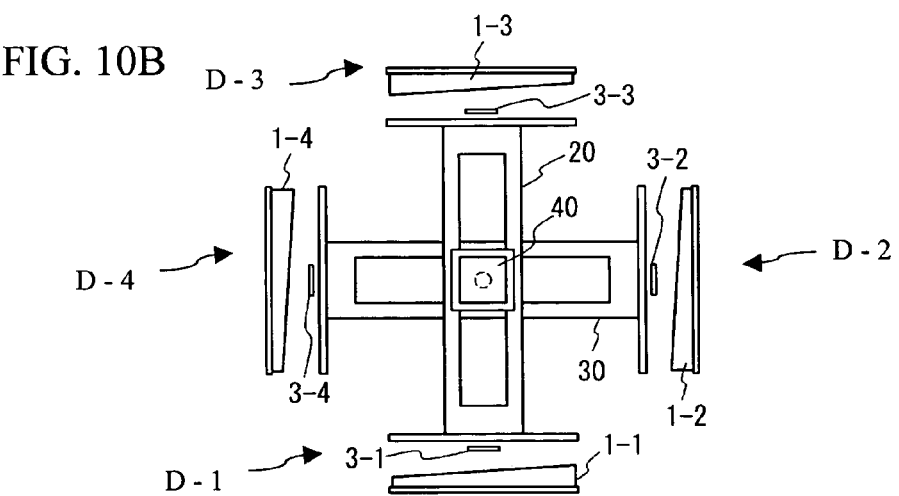
Figure 10C:
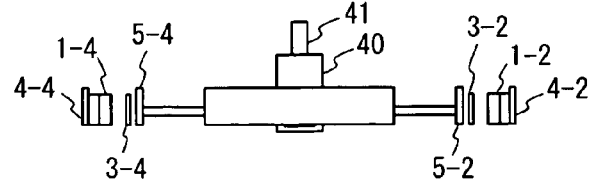
Figure 11:
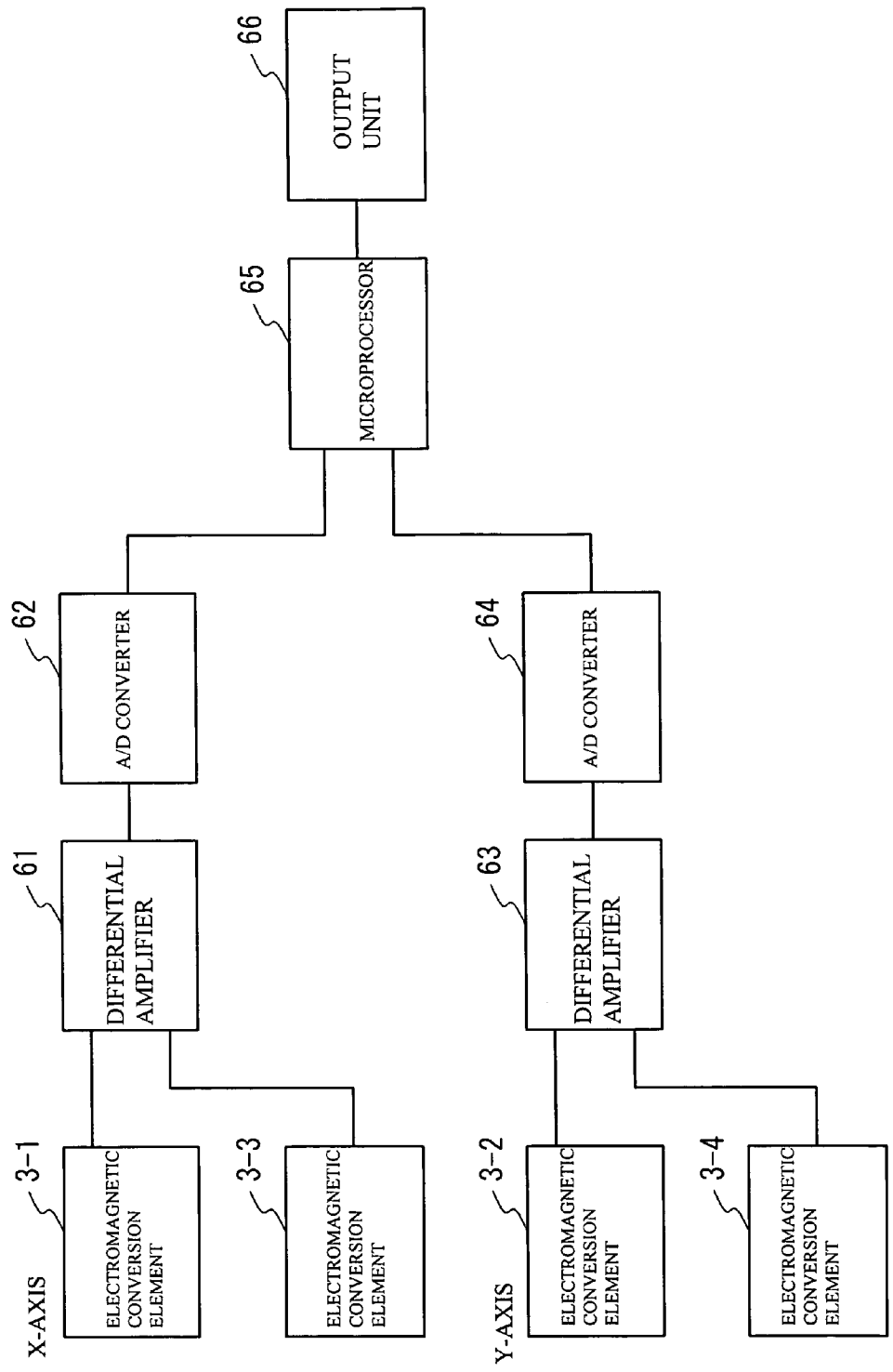
FIG. 11 is a block diagram illustrating an electrical configuration of a position detection device shown in FIG. 10.

FIG. 10 illustrates the position detection device in accordance with a sixth embodiment, in which the mechanical configuration is improved. In addition, FIG. 11 illustrates a block diagram of an electrical configuration of the position detection device shown in FIG. 10. FIG. 4 mentioned above illustrates the position detection device in which one sensor portion D is respectively arranged on the X-axis and on the Y-axis. In the position detection device shown in FIG. 10, two sensor portions D are respectively arranged on the X-axis and on the Y-axis. It is possible to obtain two kinds of position detection data from each of the two axes, if two sensor portions D are arranged on each axis as described. It is possible to double an output range by getting a difference between outputs of the electromagnetic conversion elements on the same axis, and it is possible to enlarge a dynamic range of the sensor output. Further, it is possible to cancel a noise by getting a difference between signals. Therefore, the position detection device having the configuration like this has the ability to detect the position more accurately.

A description will be given of the configuration of an improved sensor portion D with reference to FIG. 10A through FIG. 10C. FIG. 10A illustrates a perspective view of a simplified overall configuration of the position detection device. FIG. 10B illustrates a top view of the position detection device. FIG. 10C illustrates a front view of the position detection device. The same components as those shown in FIG. 4 have the same reference numerals in order to avoid a duplicated explanation. In addition, the position detection device has four sensor portions D, and additional numerals (-1 through -4) are employed for the sensor portions D, respectively.

The first slider 20 supports a magnet 1-3, a first yoke 4-3 and a inducing yoke 5-3 which form a third sensor portion D-3 at an upper side, as well as the first sensor portion D-1 arranged at a down side. An electromagnetic conversion element 3-3 arranged between the magnet 1-3 and the inducing yoke 5-3 is secured at a fixed position (on the upper side of the board 10 and in the middle in a left-and-right direction) of the board (referring to FIG. 4). An opposed face 2-3 of the magnet 1-3 tilts linearly along the X-axis direction where the first slider 20 moves. In addition, the first sensor portion D-1 and the third sensor portion D-3 provided with the first slider 20 are arranged symmetrical with respect to the center of the slider 20.

The second slider 30 also has a configuration same as that of the first slider 20. The second slider 30 supports a magnet 1-4, a first yoke 4-4 and an inducing yoke 5-4 which form a fourth sensor portion D-4 at the left side thereof. An electromagnetic conversion element 3-4 arranged between the magnet 1-4 and the inducing yoke 5-4 is secured at a fixed position (on the left side of the board 10 and in the middle in the up-and-down direction) of the board. An opposed face 2-4 of the magnet 1-4 tilts linearly along the Y-axis direction where the second slider 30 moves.

When an operator moves the movable object 40, the first slider 20 and the second slider 30 move, the magnets 1-1 and 1-3 move along the X-axis direction, and the magnets 1-2 and 1-4 move along the Y-axis direction. Accordingly, output signals based on the positions of the magnets 1-1 through 1-4 are output from the electromagnetic conversion elements 3-1 and 3-3 and the electromagnetic conversion elements 3-2 and 3-4 respectively arranged on each axis. It is possible to detect the position much more accurately by getting a difference between the two electromagnetic conversion elements with respect to each axis, as compared to a case where one electromagnetic conversion element is provided at each axis. Therefore, the position detection device having the configuration shown in FIG. 10 has the ability to detect the position of the movable object 40 on the X-Y plane more accurately.

FIG. 11 is a block diagram illustrating an electrical configuration of the position detection device shown in FIG. 10. Two electromagnetic conversion elements 3-1 and 3-3 detect the position in the direction along the X-axis respectively, convert the magnetic field intensity into a voltage, and output the voltage. A differential amplifier 61 amplifies the difference between the voltages. An A/D converter 62 converts analog signals amplified by the differential amplifier 61 into digital signals. Similarly, the electromagnetic conversion element 3-2 and 3-4 detect the position in the Y-axis direction, convert the magnetic field intensity into a voltage, and output the voltage. A differential amplifier 63 amplifies the difference between the voltages and provides the amplified difference to an A/D converter 64. The A/D converter 64 converts the analog signals to the digital signals.

A microprocessor 65 is mainly constructed of CPU and calculates an X-Y coordinate value based on the digital signals from the A/D converter 62 for the X-axis and from the A/D converter 64 for the Y-axis. The microprocessor 65 outputs the calculated data into an external device through an output unit 66.

Seventh Embodiment

Figure 12:
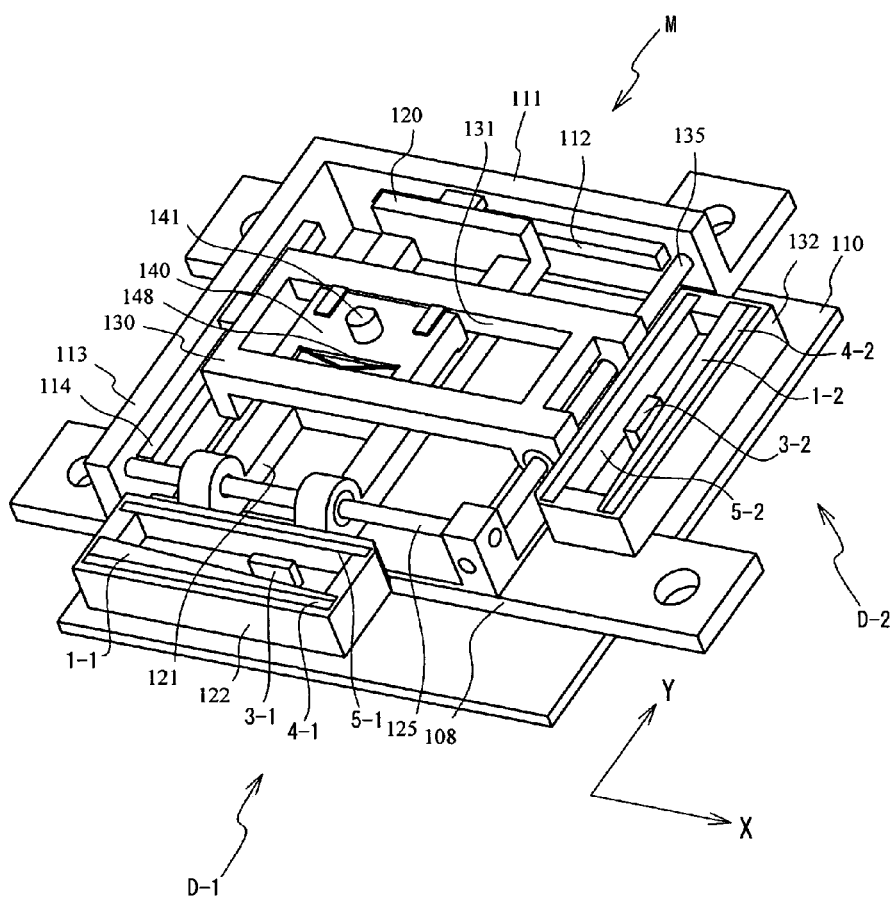
FIG. 12 illustrates a perspective view of an exterior of a pointing device in accordance with a seventh embodiment.
Figure 13:
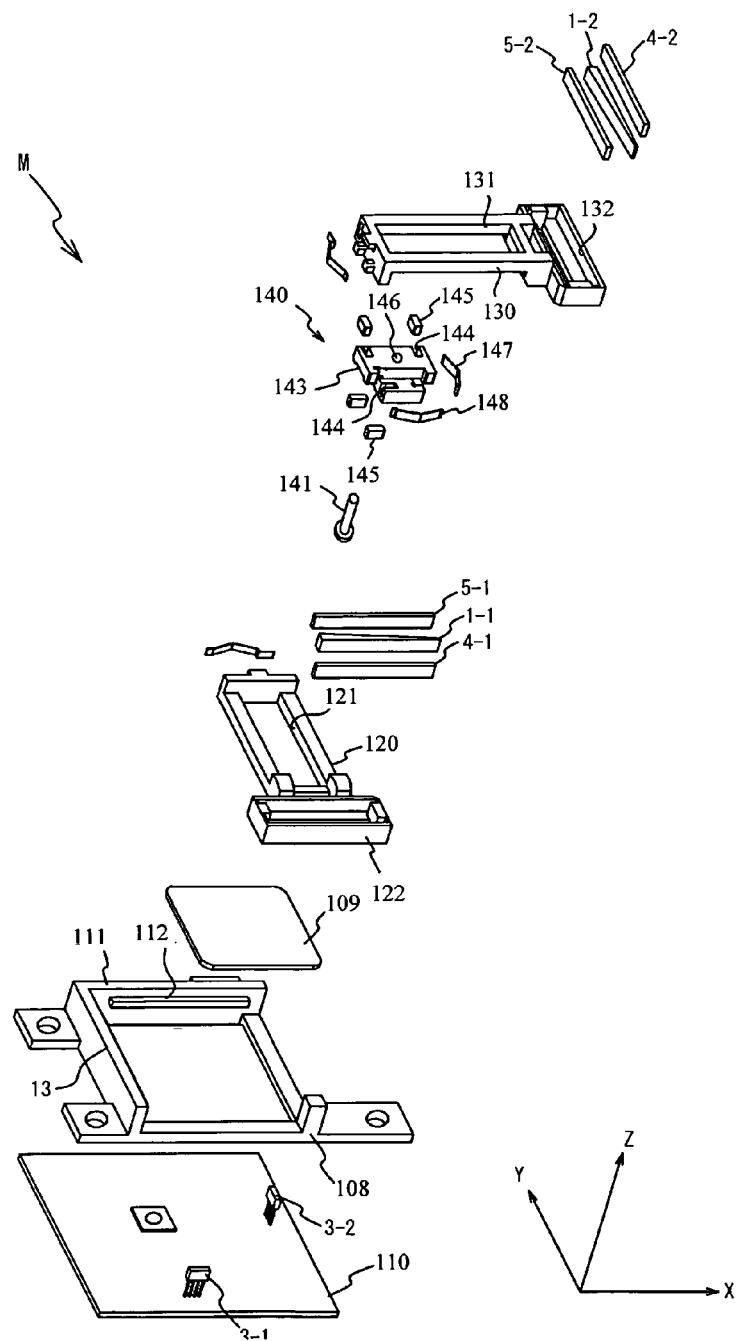
FIG. 13 illustrates an exploded perspective view of a pointing device.
Figure 14:
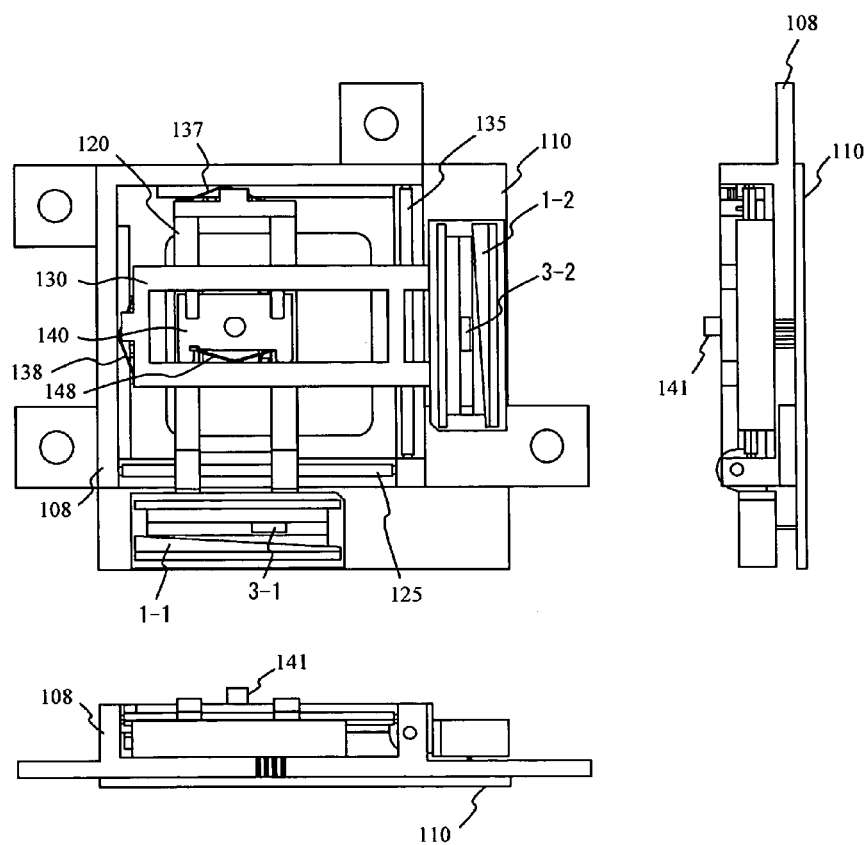
FIG. 14 illustrates a top view, a front view and a right side view of a pointing device.

FIG. 12 illustrates a perspective view of an exterior of a pointing device M in accordance with a seventh embodiment. FIG. 13 illustrates an exploded perspective view of the pointing device M. FIG. 14 illustrates a top view, a front view and a right side view of the pointing device M. The pointing device M shown in the afore-mentioned figures is configured to include two sensor portions D shown in FIG. 1, FIG. 6, FIG. 7, FIG. 8 or FIG. 9. In the pointing device M, the sensor portions D having the afore-mentioned configuration are arranged respectively on two axes crossed at right angles to each other. The same components as those shown in FIG. 1 have the same reference numerals in order to avoid a duplicated explanation. In addition, the pointing device M has two sensor portions D, and additional numerals (-1, -2) are employed with the sensor portions D respectively. Further, in FIG. 12, a description will be given using two axes, namely, X-axis and Y-axis, virtually crossed at right angles to each other.

The pointing device M is configured in such a manner that a mechanical structure is mounted on a printed board 110. The pointing device M has a first slider 120 being capable of moving along the X-axis direction and a second slider 130 being capable of moving along the Y-axis direction. The first slider 120 is guided by a rail 112, which is provided on a sidewall 111 that is provided at one side of a chassis 108 arranged on the board 110 and that is provided along the X-axis direction. The second slider 130 is guided by a rail 114, which is provided on a sidewall 113 that is provided at the other side of the chassis 108 arranged on the board 110 and that is provided along the Y-axis direction.

The first slider 120 has a substantially rectangular shape, and has an elongate hole 121 formed at the middle thereof and a support frame 122 projecting toward one end thereof. An operation portion 140 is engaged with the elongate hole 121. The operation portion 140 has an input operation shaft 141 to determine an input mentioned later. An operator moves the operation portion 140 to a desirable position by operating the input operation shaft 141. The operator can determine an input by pressing down the input operation shaft 141. The support frame 122 supports the magnet 1-1, the first yoke 4-1 and the inducing yoke 5-1 that form the first sensor portion D-1. The electromagnetic conversion element 3-1 arranged between the magnet 1-1 and the inducing yoke 5-1 is secured at a fixed position of the board 110. The opposed face 2-1 of the magnet 1-1 tilts linearly along the X-axis direction in which the first slider 120 moves. Specifically, the thickness of the magnet 1-1 is gradually reduced from the left side to the right side of the X-axis.

The second slider 130 is arranged on the first slider 120 and crossed with the first slider 120 at right angles. The second slider 130 has a same configuration as that of the first slider 120. That is, the second slider 130 has an elongate hole 131 formed at the middle thereof and a support frame 132 projecting toward one end thereof. The operation portion 140 is engaged with the elongate hole 131. The support frame 132 supports the magnet 1-2, the first yoke 4-2 and the inducing yoke 5-2 that form the second sensor portion D-2. The electromagnetic conversion element 3-2 provided between the magnet 1-2 and the inducing yoke 5-2 is secured at a fixed position of the board 110.

The operation portion 140 is engaged with the elongate hole 121 of the first slider 120 and the elongate hole 131 of the second slider 130. Therefore, when the operator moves the operation portion 140, the first slider 120 and the second slider 130 move, the magnet 1-1 moves along the X-axis direction, and the magnet 1-2 moves along the Y-axis direction. Accordingly, the magnets 1-1 and 1-2 respectively arranged on the two axes output an output signal based on the position of the operation portion 140. It is therefore possible to detect the position of the operation portion 140 on the X-Y plane.

In addition, as a preferred configuration, the pointing device M is configured to retain the operation portion 140 stably while the input operation is not being implemented (while the operation portion 140 is not being operated). The operation portion 140 is formed of multiple parts, as is confirmed in FIG. 12 and FIG. 13. The operation portion 140 has a rectangular block 143 serving as a main body. A cutout 144 is formed in the block 143. A chip part 145 is engaged with the cutout 144. The chip part 145 is a sliding member to smooth the operation of the operation portion 140 reciprocating within the elongate hole 121 and 131 included in the sliders 120 and 130.

In addition, in the operation portion 140, spring members 147 and 148 are provided so as to press the chip part 145 to inner walls of the sliders 120 and 130. As is confirmed in FIG. 12 and FIG. 13, the spring member 147 contacts the inner wall of the elongate hole 121 of the first slider 120, and biases the operation portion 140 in the Y-axis direction. Similarly, The spring member 148 contacts the inner wall of the elongate hole 131 of the second slider 130, and biases the operation portion 140 in the Y-axis direction. The spring member 147 is hidden under an upper member in the assembled structure shown in FIG. 12.

As is mentioned above, the spring member 147 is provided between the operation portion 140 and the first slider 120. The spring member 148 is provided between the operation portion 140 and the second slider 130. The first slider 120 and the second slider 130 retains the operation portion 140 to be capable of reciprocating. Hence, it is possible to generate a frictional force between the operation portion 140 and the inner walls of the sliders 120 and 130. This frictional force does not generate an excessive load and does not effect the operation while the operator is operating. On the other hand, the frictional force is set so as to prevent the movement of the operation portion 140 if the pointing device is moved while the pointing device is not being used. This makes it possible to operate the operation portion 140 smoothly during the input operation and realize a configuration in which the operation portion 140 is retained at a fixed position while the pointing device is not being operated. The spring members 147 and 148 may be selected as necessary so that desirable frictional force is obtained by the spring stresses thereof.

Further, the pointing device M has a mechanism to settle or determine an input after the operation portion 140 moves to a given position on the X-Y plane. In the block 143 being a main body of the operation portion 140, a through hole 146 to be inserted with the input operation shaft 141 is formed, as is shown in FIG. 13. The input operation shaft 141 is slidably inserted into the through hole 146 from the lower side in a Z-axis direction. The Z-axis is vertical to the X-axis and the Y-axis for illustrative purpose.

In addition, an elastic board 109 is provided in the chassis (frame) 108 as is shown in FIG. 13. The elastic board 109 is located below the operation portion 140 when the pointing device M is assembled. The elastic board 109 deforms elastically toward the lower side (downwardly along the Z-axis) when the input operation shaft 141 is pressed. The board 110, on which a given circuit pattern is formed, is located below the elastic board 109. An input determination switch 150 is provided at a given position on the board 110 so as to output a determination signal when pressed. The elastic board 109 and the chassis 108 may be formed integrally. The elastic board 109 may be formed inside the chassis 108. For example, a rubber member having a sheet shape may be employed for as the elastic board 109 arranged separately in the chassis 108. The pointing device M in accordance with the seventh embodiment may include the board 110, or may include an upper assembling part except the board 110, which is provided separately from the pointing device M. If the pointing device M is considered as the upper assembling part, the pointing device M will be used to set on the board 110 which is separately provided by a user.

Figure 15:
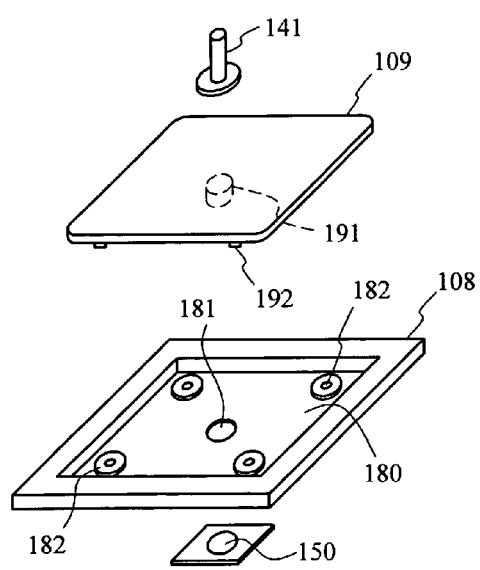
FIG. 15 illustrates a relationship between an input operation shaft and an elastic board schematically for illustrative purpose.

FIG. 15 schematically illustrates a relationship between the input operation shaft 141 and the elastic board 109 to facilitate understanding of the invention. If the elastic board 109 is formed of rubber, a support board 180 may be provided in the chassis 108. Multiple holes are formed in the support board 180. A hole 181 formed in the middle of the support board 180 is formed so that a projection 191 provided on the elastic board 109 is allowed to project toward the lower side. Another hole 182 formed in the support board 180 is a hole for position determination. The position of the elastic board 109 is determined accurately at a given position by engaging the projection 192 provided on the elastic board 109 with the hole 182.

Figure 16A:
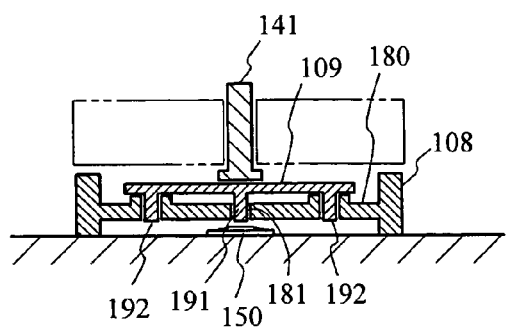
FIG. 16A through FIG. 16C illustrate cases where an operator presses an input operation shaft.
Figure 16B:
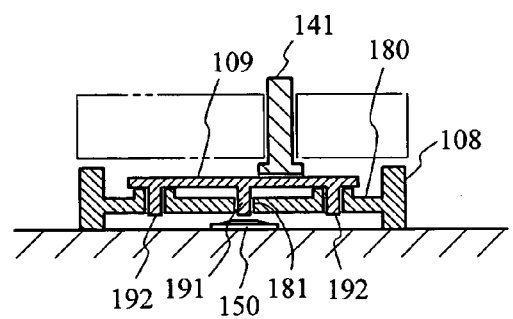
Figure 16C:
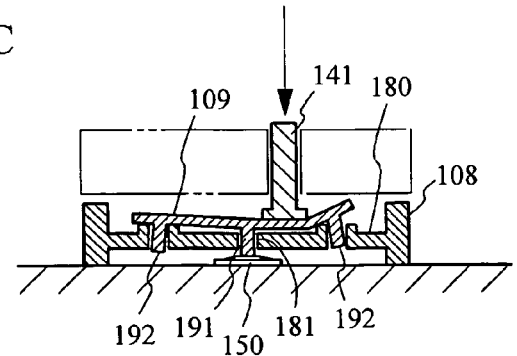

FIG. 16A through FIG. 16C illustrate cases where the operator presses the input operation shaft 141. FIG. 16A through FIG. 16C do not include surrounding members for the purpose of simplification to illustrate the operations of the input operation shaft 141. The elastic board 109 is arranged under a whole area where the input operation shaft 141 moves. Therefore, the elastic board 109 remains under the input operation shaft 141, even if the input operation shaft 141 (the operation portion 140) is moved from the middle position, as shown in FIG. 16A, to another position, as shown in FIG. 16B, by the pointing operation of the input operation shaft 141. Here, the input operation shaft 141 is pressed as is shown in FIG. 16C, and then the switch 150 provided under the input operation shaft 141 is pressed accordingly to the deformation of the elastic board 109.

Figure 17:
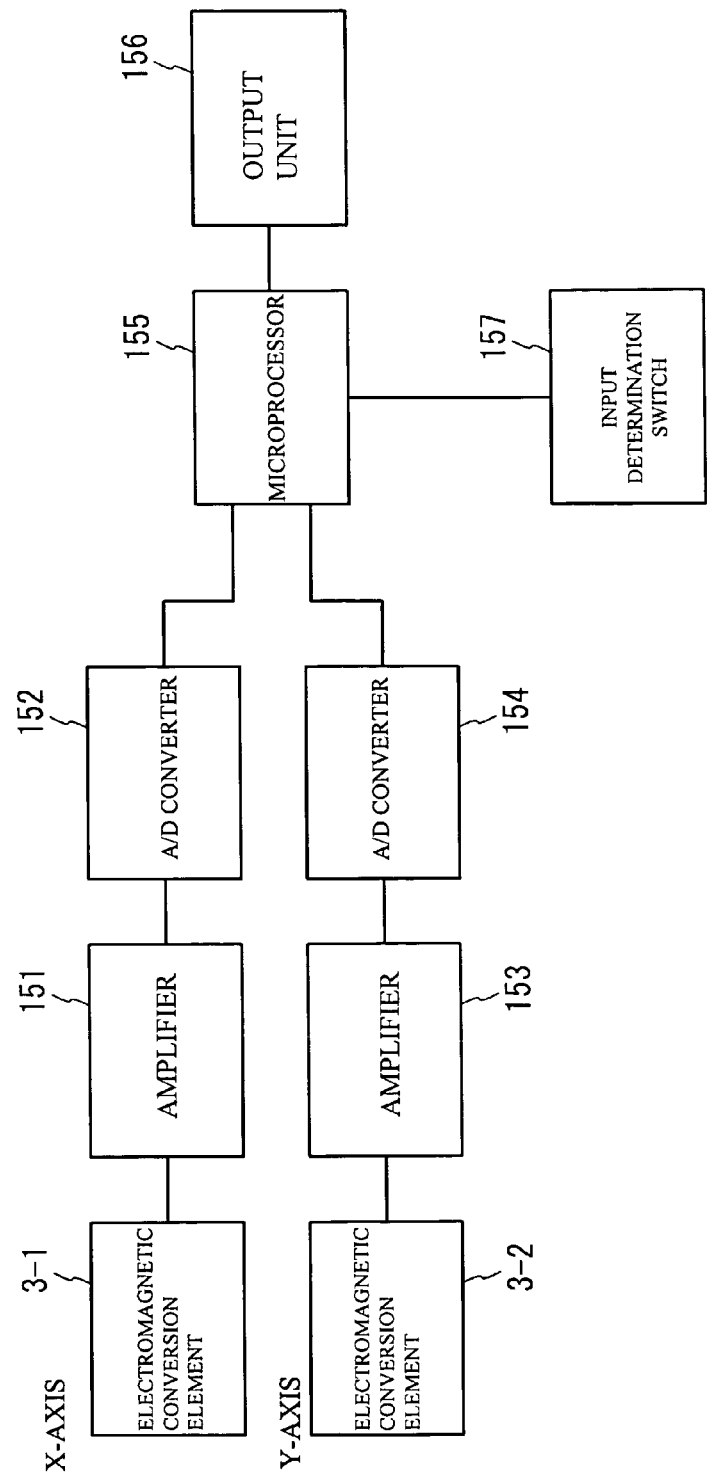
FIG. 17 illustrates a block diagram of electric configuration of a pointing device in accordance with a seventh embodiment.

FIG. 17 illustrates a block diagram of electric configuration of the pointing device M in accordance with the seventh embodiment. The electric configuration shown in FIG. 17 may be arranged on the board 110 shown in FIG. 12. The electromagnetic conversion element 3-1 detecting the position in the X-axis direction converts the magnetic field intensity into the voltage, and outputs the voltage. An amplifier 151 amplifies the voltage. An A/D converter 152 converts the analog signal amplified by the amplifier 151 into the digital signal. Similarly, the electromagnetic conversion element 3-2 detecting the position in the Y-axis direction converts the magnetic field intensity into the voltage, and outputs the voltage. An amplifier 153 amplifies the voltage and provides the amplified voltage to an A/D converter 154. The A/D converter 154 converts the analog signal into the digital signal.

A microprocessor 155 is mainly constructed of CPU. The microprocessor 155 calculates an X-Y coordinate value based on digital signals from the A/D converter 152 at the X-axis side and from the A/D converter 154 at the Y-axis side. Further, a determination signal 157 is provided to the microprocessor 155, when the input determination switch 150 is pressed. The microprocessor 155 outputs a position information signal based on the calculated data and the determination signal 157 to be output when the input determination switch 150 is pressed into an outer device such as a computer through an output unit 156.

First Variation Example

Figure 18:
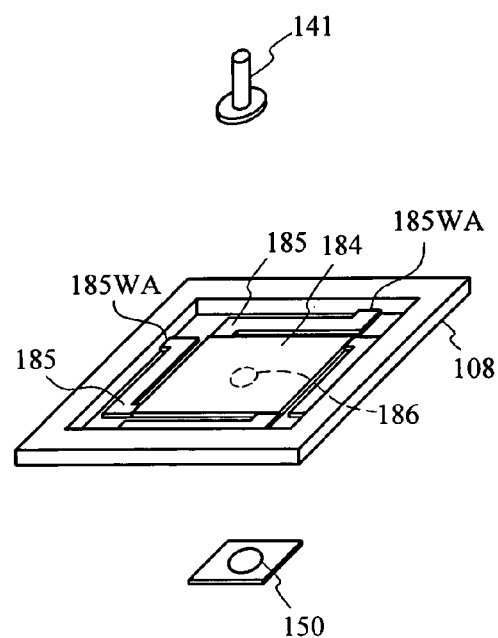
FIG. 18 illustrates a relationship between an input operation shaft and an elastic board schematically.
Figure 19A:
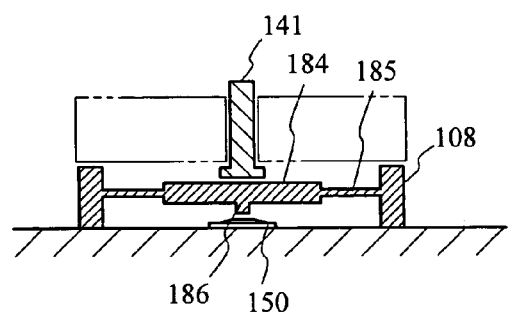
FIG. 19A through FIG. 19C illustrate cases where an operator presses an input operation shaft as in a case of FIG. 16.
Figure 19B:
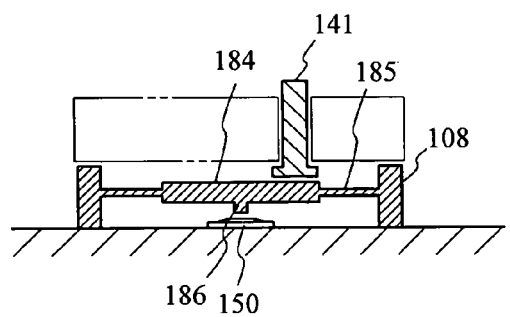
Figure 19C:
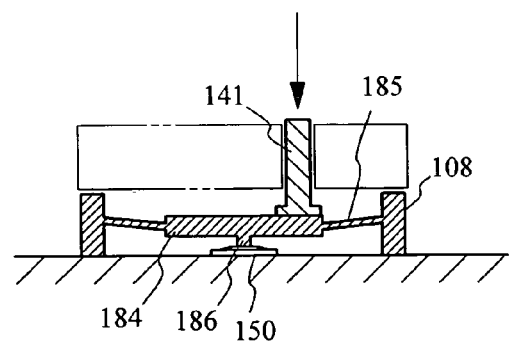

FIG. 18 and FIG. 19A through FIG. 19C illustrate a first variation example in accordance with the seventh embodiment. FIG. 18 schematically illustrates a relationship between the input operation shaft 141 and the elastic board 109. FIG. 19A through FIG. 19C illustrate cases where the operator presses the input operation shaft 141 as in the case of FIG. 16A through FIG. 16C. The figures are schematically illustrated for simplification. In this configuration, an elastic board 184 is formed integrally in the chassis 108. A side part of the elastic board 184 is connected to an inner wall 108WA of the chassis 108 through an elastic arm 185.

In the structure shown in FIG. 16A through FIG. 16C, the elastic board 109 is provided separately as an elastic member. However, in the structure shown in FIG. 18, the elastic board 184 is provided integrally in the chassis 108. This enables simplifying the structure. The elastic board 184 may be provided in the chassis 108 after assembling, yet it is desirable to form the elastic board 184 and the chassis 108 integrally when manufactured, in terms of the manufacture efficiency and product strength. A projection 186 is provided to press the switch 150 down on the lower face of the elastic board 184.

FIG. 19A through FIG. 19C do not include the surrounding parts for the purpose of simplification to illustrate the operations of the input operation shaft 141. Only the input operation shaft 141 is shown, although the input operation shaft 141 is a part of the operation portion 140. The elastic board 184 is arranged under a whole area where the input operation shaft 141 moves. The elastic board 184 still remains under the input operation shaft 141, even if the input operation shaft 141 (the operation portion 140) shown in FIG. 19A is moved from the middle position to another position shown in FIG. 19B by pointing operation of the input operation shaft 141. Here, the input operation shaft 141 is pressed down as is shown in FIG. 19C, and then the switch 150 provided under the input operation shaft 141 is pressed accordingly to the deformation of the elastic board 184.

Second Variation Example

Figure 20A:
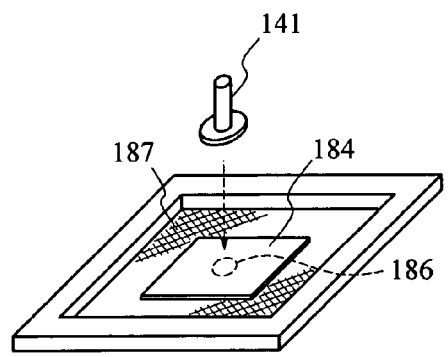
FIG. 20A and FIG. 20B illustrate a second variation example provided in a chassis.
Figure 20B:
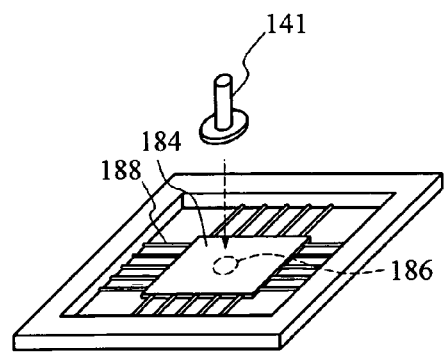

FIG. 20A and FIG. 20B illustrate a second variation example provided in the chassis 108. FIG. 20A illustrates a case where an elastic sheet 187 formed of a fabric, a wire fabric or the like having a certain elastic force is provided to be stretched in the chassis 108 so that the elastic sheet 187 can retain the elastic board 184 to be pressed at the center thereof. FIG. 20B illustrates a case where wires 188 are provided to be strained in the chassis 108 so that the wires 188 retain the elastic board 184 to be pressed at the center thereof. In the afore-described structure, the input operation shaft 141 is pressed down accordingly to the deformation of the elastic sheet 187 or the wire 188, and then the switch 150 is pressed down by the projection 186 on the lower face, as described in the seventh embodiment.

Eighth Embodiment

Figure 21:
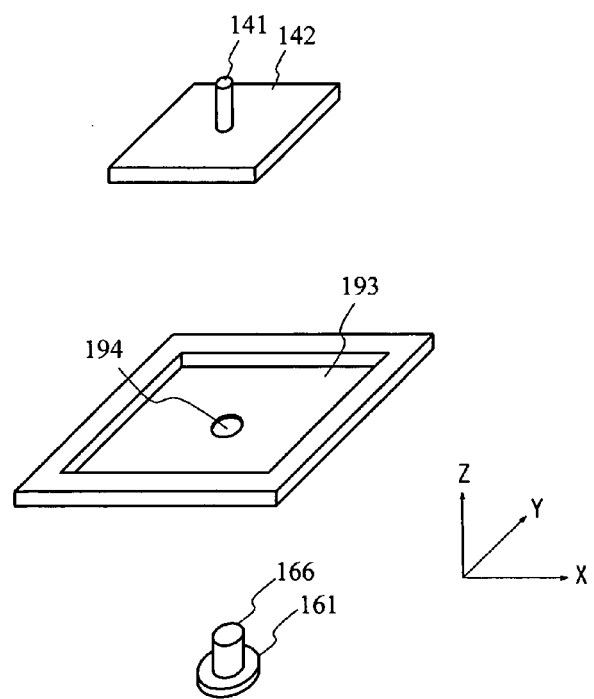
FIG. 21 illustrates a relationship between an input operation shaft and a chassis schematically.
Figure 22A:
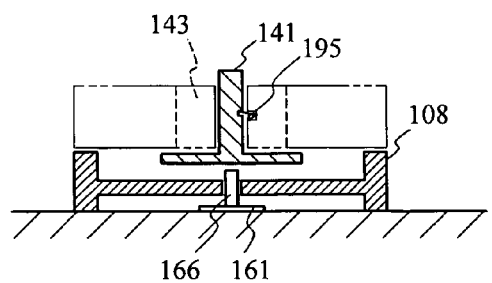
FIG. 22A through FIG. 22C illustrate cases where an operator presses an input operation shaft down.
Figure 22B:
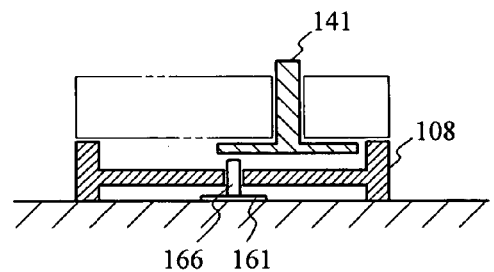
Figure 22C:
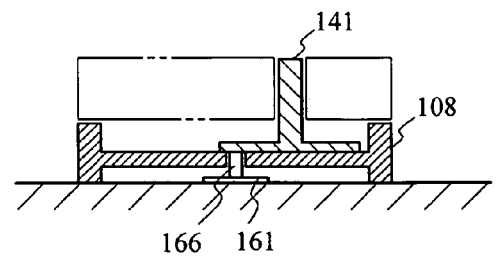

A description will be given of a case where the switch 150 is pressed down by the input operation shaft 141 of the pointing device M. FIG. 21 schematically illustrates a relationship between the input operation shaft 141 and the chassis 108. FIG. 22A through FIG. 22C illustrate cases where the operator presses down the input operation shaft 141. In the structure, a support board 193 is formed in the chassis 108. A through hole 194 is formed at the center of the support board 193. An input projection 166 of a switch 161 arranged under the support board 193 is engaged with the through hole 194 to be vertically movable. The switch 161 has the same effect as that of the switch 150 mentioned above, but has the input projection 166 projecting upwardly, which is not included in the switch 150.

A guard portion 142, projecting outward in parallel with the X-Y plane, is provided at the bottom side of the input operation shaft 141. The guard portion 142 is formed widely enough to press the input projection 166 wherever the input operation shaft 141 moves on the X-Y plane.

FIG. 22A through FIG. 22C does not include the surrounding parts for the purpose of simplification to illustrate operations of the input operation shaft 141. The guard portion 142 is provided so as to press the input projection 166 of the switch 161 under a whole area where the input operation shaft 141 moves. The input projection 166 still remains under the guard portion 142, even if the input operation shaft 141 (the operation portion 140) shown in FIG. 22A is moved from the center point to another position shown in FIG. 22B by pointing operation of the input operation shaft 141. The input operation shaft 141 is pressed down as is shown in FIG. 22C, and then the input projection 166 of the switch 161 provided under the guard portion 142 is pressed down.

In the structure in accordance with the eighth embodiment, the input operation shaft 141 is provided to be vertically movable in the block 143, which serves as a main body. For example, FIG. 22A illustrates a structure in which a board-shaped spring 195 is interposed between the block 143 and the input operation shaft 141. The input operation shaft 141 is capable of moving vertically to the block 143, and the board-shaped spring 195 is configured so that the upper position of the input operation shaft 141 (the position in the Z-axis direction) can be retained at a fixed level.

In accordance with the eighth embodiment described above, a deformable member is provided. The deformable member deforms when the input operation shaft 141 is pressed down, and in addition, the switches 150 and 161 can be pressed down in the whole area where the input operation shaft 141 moves. It is thus possible to provide a pointing device settling or determining an input easily after the pointing operation.

Ninth Embodiment

Figure 23:
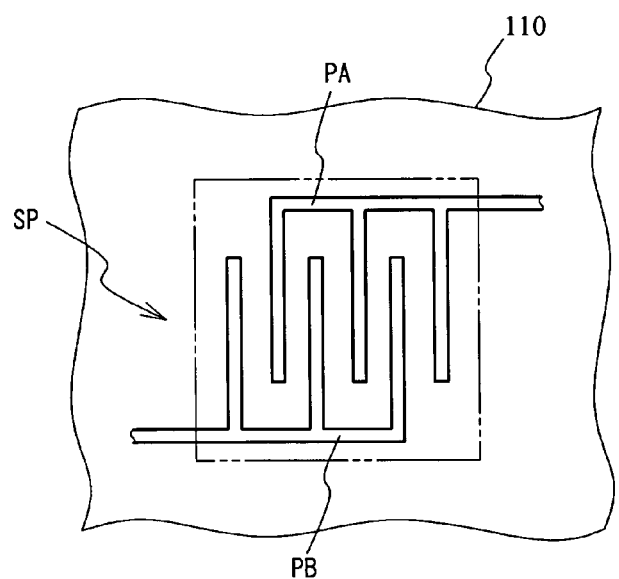
FIG. 23 illustrates separately provided patterns formed on a board.

In the embodiment mentioned above, the pointing device is configured to include the switch provided at the lower side that is turned on by the projection. However, the structure is not limited to those mentioned above. For example, a structure may be employed in such a manner that a pattern PA and a pattern PB are electrically separated at given positions on the board 110 as shown in FIG. 23 and an electrically conductive member connecting the patterns is pressed down. In this manner, it is possible to provide the pointing device to be capable of determining an input as is in the case mentioned above.

A detailed explanation will be omitted, because fundamental structure of the pointing device M in accordance with the present embodiment mentioned below is same as those shown in FIG. 1 through FIG. 3, FIG. 12, FIG. 13 and FIG. 17. A description will be given of a characteristic structure in which an input is determined by pressing down the input operation shaft 141, referring to the accompanying schematic figures. In those figures, "SP" denotes a portion on which the separately provided patterns mentioned above are formed.

Figure 24A:
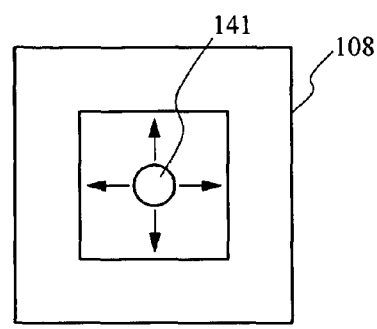
FIG. 24A through FIG. 24C illustrate an input determination mechanism in accordance with a ninth embodiment.
Figure 24B:
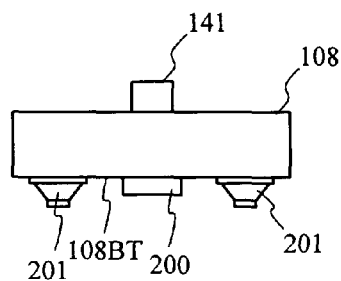
Figure 24C:
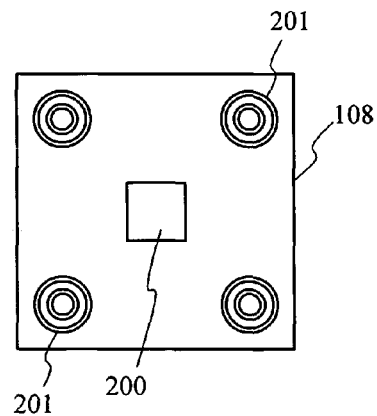

FIG. 24A through FIG. 24C illustrate an input determination mechanism in accordance with a ninth embodiment. A structure shown in FIG. 24A through FIG. 24C includes the chassis 108, which descends when the input operation shaft 141 is pressed down. FIG. 24A schematically illustrates a top view of the pointing device M. FIG. 24B schematically illustrates a front view of the pointing device M. FIG. 24C schematically illustrates a bottom view of the pointing device M. The operation portion 140 is not shown in FIG. 24A through FIG. 24C. The input operation shaft 141 is secured on the block 143 of the operation portion 140. A force generated by operator's pressing the input operation shaft 141 is transmitted to the chassis 108, because the vertical movement of the operation portion 140 is limited by the sliders 120 and 130 as is mentioned above.

Figure 25:
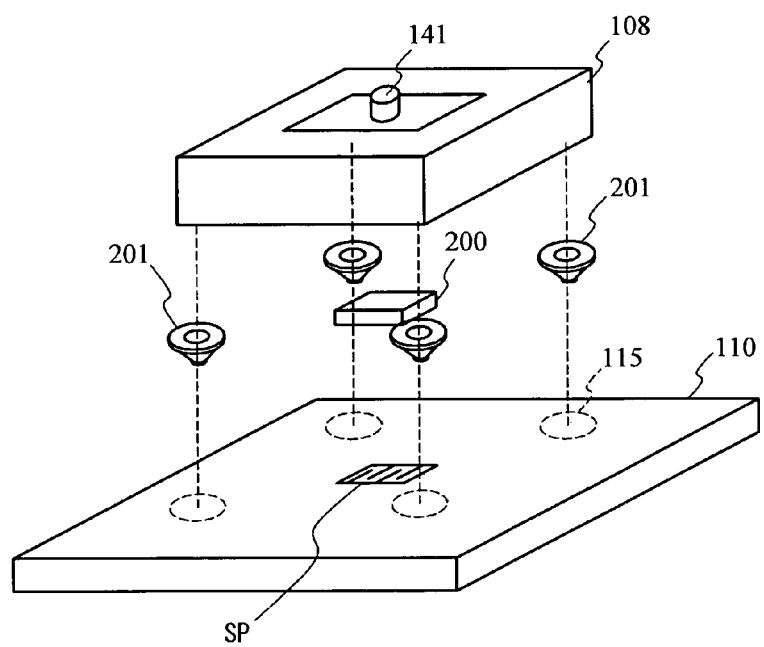
FIG. 25 illustrates a case where a structure shown in FIG. 24 is set on a board.

As shown in FIG. 24B and FIG. 24C, an electrically conductive projection 200 is provided on a bottom face 108BT of the chassis 108 to connect the separately provided patterns SP electrically. Further, an elastically deformable rubber member 201, which is formed into a cone shape or a dome shape, is provided on the bottom face 108BT. FIG. 25 illustrates the pointing device M shown in FIG. 24 set on the board 110. The pointing device M shown in FIG. 24 is set so that the projection 200 secured on the bottom face 108BT of the chassis 108 is opposed to the separately provided patterns SP arranged at fixed positions. Preferably, a concave portion 115 may be provided on the board 110 to determine the position of the rubber member 201. The pointing device in accordance with the present invention may be a semifinished product before being set on the board 110 shown in FIG. 24, or may be a finished product in which the device is mounted on the board 110 shown in FIG. 25.

Figure 26A:
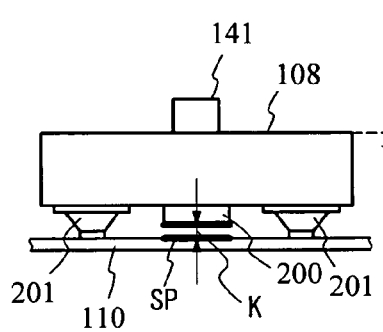
FIG. 26A and FIG. 26B illustrate cases where an operator presses an input operation shaft down.
Figure 26B:
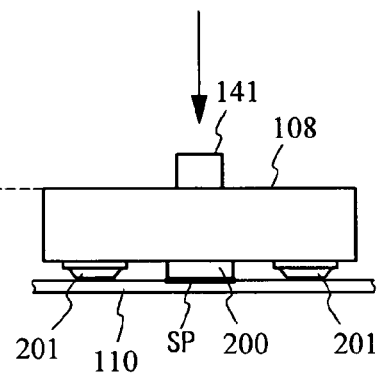

FIG. 26A and FIG. 26B illustrate the input operation shaft 141 being pressed down by the operator. The conductive projection 200 and the separately provided patterns SP are arranged at a given interval K, if the pointing device M is mounted on the board 110 as is shown in FIG. 25. The interval is determined to be smaller than a deforming amount H of the rubber member 201 when the input operation shaft is pressed down and bent. As shown in FIG. 26B, it is possible to connect the separately provided patterns SP with the projection 200 by pressing the input operation shaft 141.

Preferably, the projection 200 may be deformed elastically when the projection 200 contacts the separately provided patterns SP. The projection 200 may be formed of electrically conductive rubber, rubber coated with a carbon for providing electrical conductivity to a surface 200S, rubber having an electrically conductive metal formed on the lower face thereof or the like. FIG. 27A and FIG. 27B schematically illustrate an enlarged view of a rubber member 201, which is bent (deformed) when the input operation shaft 141 is pressed.

Third Variation Example

Figure 28:
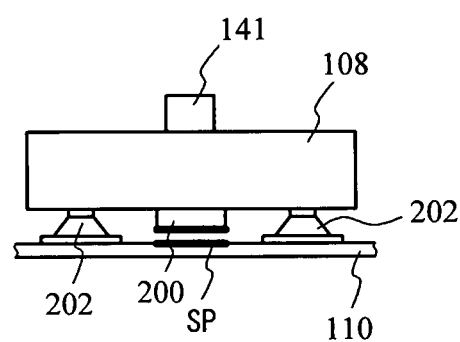
FIG. 28 illustrates a third variation example based on a ninth embodiment.

FIG. 28 illustrates a third variation example based on the ninth embodiment. A rubber member 202 shown in FIG. 28 may be formed broader toward the lower side, although the rubber member 201 of the pointing device in accordance with the ninth embodiment is formed broader toward the upper side.

Forth Variation Example

Figures 29A, 29B:
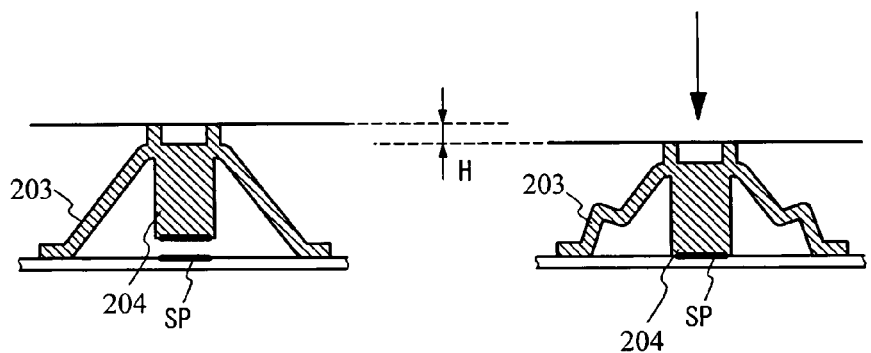
FIG. 29A and FIG. 29B illustrate a fourth variation example based on a ninth embodiment.

FIG. 29A and FIG. 29B illustrate a fourth variation example based on the ninth embodiment. The rubber member 201 of the pointing device in accordance with the ninth embodiment is provided so as to deform elastically. In the structure shown in the present variation example, an electrically conductive projection 204 is formed in a rubber member 203 and the rubber member 203 contacts the separately provided patterns SP provided on the board 110 when bent. It is preferable to employ the structure because the separately provided patterns SP are protected.

Fifth Variation Example

Figure 30:
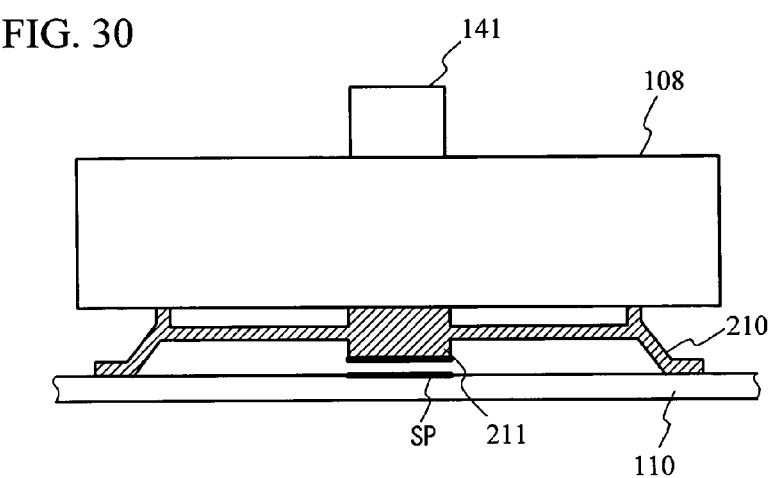
FIG. 30 illustrates a fifth variation example based on a ninth embodiment.

FIG. 30 illustrates a fifth variation example based on the ninth embodiment. Multiple rubber members 201 of the pointing device in accordance with the ninth embodiment are provided as surrounding parts. In the structure in accordance with this variation example, a rubber member 210 is provided to be formed widely to cover the bottom part of the chassis 108. An electrically conductive projection 211 is formed in a space inside the rubber member 210. The projection 211 contacts the separately provided patterns SP provided on the board 110 when the rubber member 210 is bent. It is possible to protect the separately provided patterns SP and a circuit on the board 110 as well, if the afore-mentioned structure is employed.

In the embodiments mentioned above, multiple examples have been explained respectively for cases where the switch 150 for input determination is arranged on the board 110 and those where the separately provided patterns SP are formed on the board 110. The structure concerning the switch may be modified appropriately and employed with the separately provided patterns. Similarly, The structure concerning the separately provided patterns may be modified appropriately and employed with the switch. As mentioned above, rubber is employed for an elastic member as an example. However, a spring may be employed instead of rubber.

Tenth Embodiment

A description will be given of an input device N. The input device N has a same structure as that of the pointing device M. So, the same description will be omitted. In the tenth embodiment, the spring members 147 and 148 correspond to the friction generator.

Figure 31A:
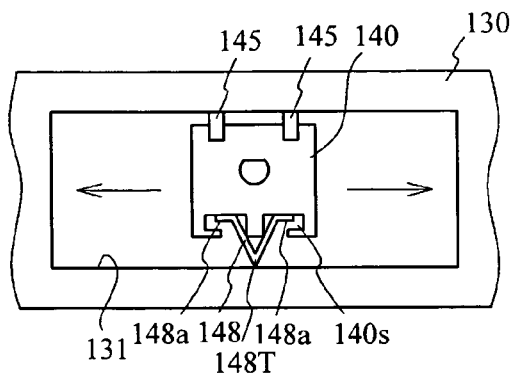
FIG. 31A through FIG. 31D illustrate a schematic view of a spring member arranged between an operation portion and an elongate hole of a second slider.

FIG. 31A through FIG. 31D schematically illustrate a view of the spring member 148 arranged between the operation portion 140 and the elongate hole 131 of the second slider 130. In the same manner, the spring member 147 arranged between the operation portion 140 and the elongate hole 121 of the second slider 130. FIG. 31A illustrates an enlarged view of a configuration example in accordance with the tenth embodiment. The spring member 148 is capable of generating a stable bias force and a frictional force between the operation portion 140 and the second slider 130, because the spring member 148 is a sheet-shaped spring folded into a mount-like shape and has a center impeller structure in which both end parts 148a are supported by the operation portion 140 at two positions. It is preferable that a space 140S should be formed around the operation portion 140 so that the spring member 148 can be deformed easily, as is shown in FIG. 31A in this manner, with the space 140S, it is possible to adjust a feeling of spring stress.

Figure 31B:
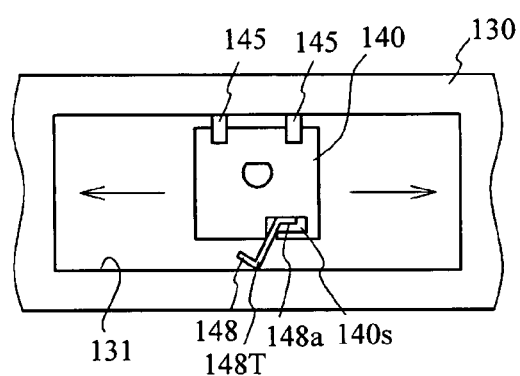
Figure 31C:
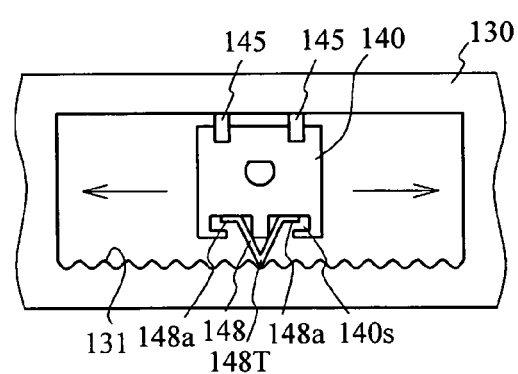
Figure 31D:
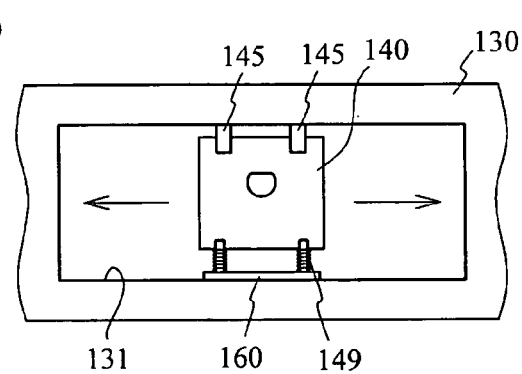

FIG. 31B illustrates a configuration example in which the spring member 148 is formed to have a dogleg shape and has a cantilever structure. FIG. 31C illustrates a variation example based on that shown in FIG. 31A. An inner wall of the elongate hole 131 has a concavo-convex shape. A top part 148T of the spring member 148 formed into a mount-like shape is engaged with the inner wall having the concavo-convex shape. In this structure, a given frictional force can be generated between the operation portion 140 and the inner wall of the slider 130 and a click feeling can be generated as well. It is possible to give an operational feeling to the operator by generating the click feeling. In addition, it is possible to retain the operation portion 140 at a fixed position certainly by engaging the top part 148T with the concave portion of the inner wall. FIG. 31D illustrates a configuration example in which the friction generator is formed of a coil spring 149 serving as a spring member and a pressing board 160 serving as a pressing member biased by the coil spring 149. In this structure, it is possible to retain the operation portion 140 at a fixed position because the pressing board 160 contacts the inner wall of the slider 130 widely.

FIG. 31A through FIG. 31D illustrate a structure generating the frictional force provided only at one side, yet two of the afore-mentioned structures generating the frictional force may be provided at both sides. The structures shown in FIG. 31A through FIG. 31D may be combined appropriately to provide the spring members at both sides.

Eleventh Embodiment

A description will be given of a configuration example to retain the operation portion 140 of the input device N at a fixed position. Here, referring to FIG. 12 through FIG. 14 again, the first slider 120 is guided at one side by the rail 112 as mentioned above. The first slider 120 is slidably engaged with a guide shaft 125, not shown in FIG. 13, which is arranged in the chassis 108 at the support frame 122 side. Similarly, the second slider 130 is slidably engaged with a guide shaft 135, which is arranged in the chassis 108 at the support frame 132 side.

The first slider 120 and the second slider 130 are respectively retained by the guide shafts 125 and 135 to be capable of reciprocating, although the operation portion 140 serves as a movable object in the tenth embodiment. The first slider 120 and the second slider 130 serves as movable objects relative to the guide shafts 125 and 135. In addition, the first slider 120 and the second slider 130 are retained at fixed positions, allowing the operation portion 140 to be retained at a fixed position, as in the case of the tenth embodiment.

Figure 32:
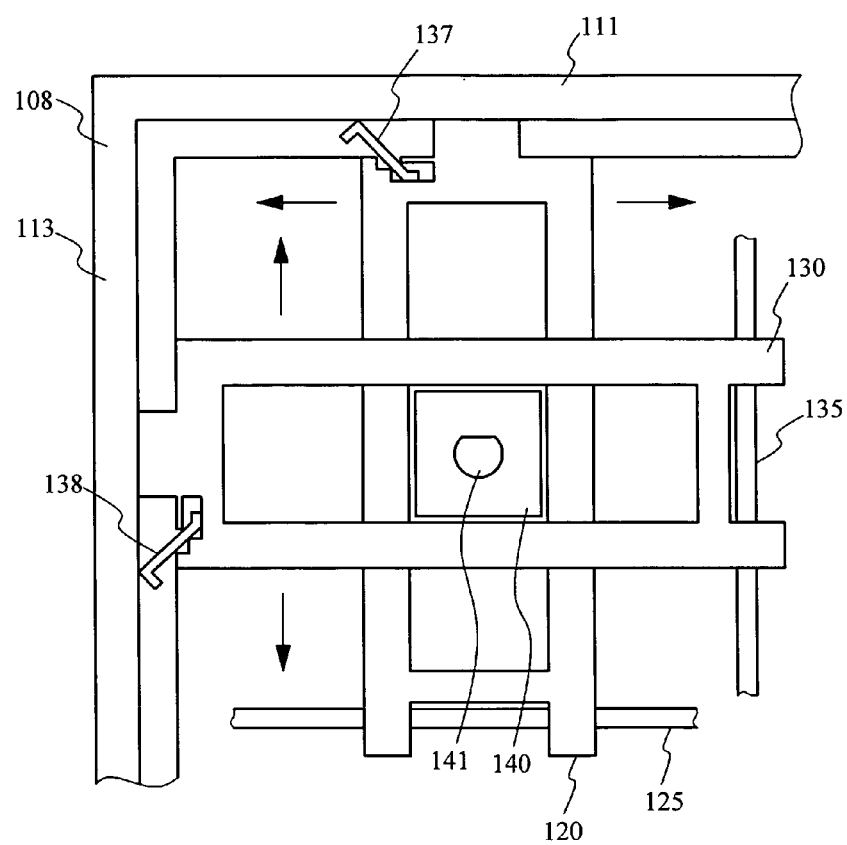
FIG. 32 illustrates a structure in accordance with an eleventh embodiment.

FIG. 32 illustrates a structure in accordance with the eleventh embodiment in which spring members 137 and 138 generating the frictional forces with the chassis 108 are respectively provided at ends of the first slider 120 and the second slider 130. The spring members 137 and 138 shown in FIG. 32 have a same structure as that illustrated in FIG. 31B. If the first slider 120 and the second slider 130 are configured as movable objects and generate the frictional forces with the chassis 108 in the structure shown in FIG. 32, it is also possible to retain the operation portion 140 stably as in the case in accordance with the tenth embodiment.

Figure 33:
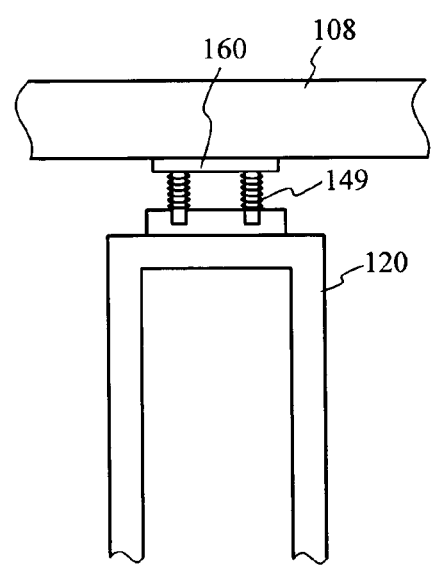
FIG. 33 illustrates a variation example based on an eleventh embodiment.

Furthermore, FIG. 33 illustrates a variation example based on the eleventh embodiment. The friction generator provided between the first slider 120 and the chassis 108 may have a structure shown in FIG. 33. This structure is same as that shown in FIG. 31D. The structures shown in FIG. 31A through FIG. 31D may employ the friction generator to generate the frictional force between the first slider 120 and the chassis 108. The same goes for the friction generator provided between the second slider 130 and the chassis 108.

In the tenth embodiment, the description has been given of only the spring members 147 and 148 providing the frictional force to the operation portion 140. However, FIG. 12 through FIG. 14 illustrate the structure in which the spring members 137 and 138 generating the frictional force to the first slider 120 and the second slider 130. That is, FIG. 12 through FIG. 14 illustrate the input device having the structure in accordance with the eleventh embodiment. Therefore, the structure may include the spring members 147 and 148 providing frictional force to the operation portion 140 and the spring members 137 and 138 providing frictional force to the first slider 120 and the second slider 130. The frictional force generated by the afore-mentioned double structure makes it possible to retain the operation portion 140 at a fixed position appropriately. The structure in which the spring member is provided at one side may be employed.

Twelfth Embodiment

Figure 34A:
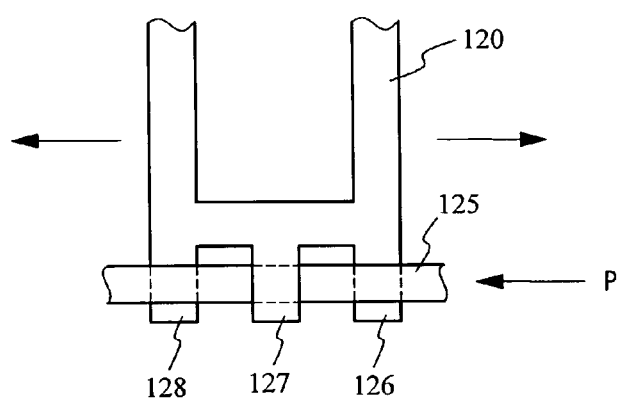
FIG. 34A and FIG. 34B illustrate a first slider and a guide shaft in accordance with a twelfth embodiment.
Figure 34B:
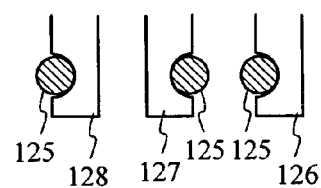

A description will be given of a structure in which the operation portion 140 is retained stably in the input device N. FIG. 34A and FIG. 34B illustrate the first slider 120 and the guide shaft 125 in accordance with the twelfth embodiment.

FIG. 34A illustrates a top view. FIG. 34B illustrates surrounding parts of the guide shaft 125 viewing from P. Three latching portions 126, 127 and 128 are projected from the ends of the first slider 120. The three latching portions are provided along the guide shaft 125. The latching portions hold the guide shaft 125 therebetween. The latching portions 126 and 128 at both ends are arranged at one side and the latching portion 127 at the center is arranged at the other side. That is, the latching portions 126, 127 and 128 are arranged alternately on the opposite sides of the guide shaft 125. The guide shaft 125 retains the first slider 120 using the three latching portions 126, 127 and 128.

In the structure shown in FIG. 34A and FIG. 34B, the latching portions 126, 127 and 128 serve as a friction generator and generate the frictional force with the guide shaft 125. A structure in which the operation portion 140 is retained stably at a fixed position is implemented as in the case in accordance with the eleventh embodiment. In particular, it is easy to form the structure of the first slider 120 shown in FIG. 34 with a metal mold. In addition, it is also easy to assemble the structure by compressing the latching portions 126, 127 and 128 of the first slider 120 into the guide shaft 125. Thus, it is possible to reduce the costs, because component costs can be reduced and the manufacturing efficiency can be improved in the structure shown in FIG. 34A and FIG. 34B. Similarly, it is possible to form the second slider 130 and the guide shaft 135.

Figure 35A:
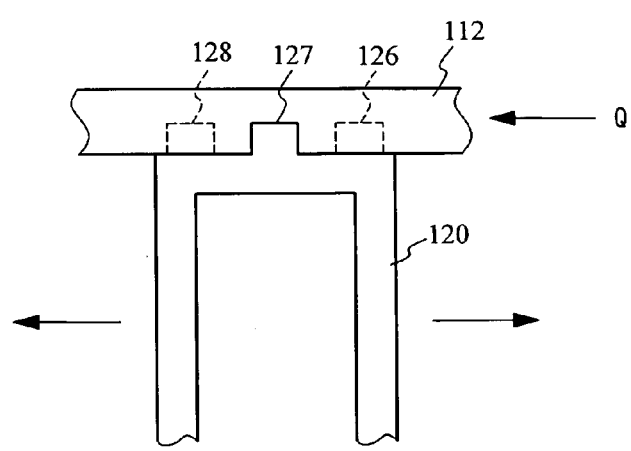
FIG. 35A and FIG. 35B illustrate a variation example based on a twelfth embodiment.
Figure 35B:
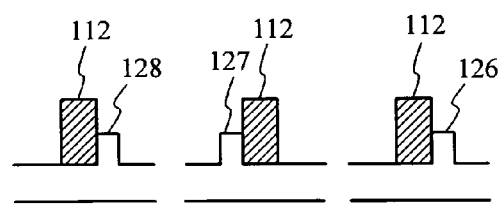

FIG. 35A and FIG. 35B illustrate a variation example based on the twelfth embodiment. These figures illustrate the first slider 120 and the rail 112. FIG. 35A illustrates a top view. FIG. 35B illustrates surrounding parts of the rail 112 viewing from Q. The structure shown in FIG. 35A and FIG. 35B is changed so that the three latching portions 126, 127 and 128 are latched in the rail 112 (referring to FIG. 12 and FIG. 13) provided at the side of the chassis 108. If this structure is employed, it is possible that the cross-sections of the latching portions have rectangular shapes. The afore-mentioned structure has a same effect as that shown in FIG. 12. It is preferable that the latching portions be provided alternately in the twelfth embodiment and this variation example. However, the latching portions may be provided to face each other to hold the guide shaft 125 and the rail 112. In this case, the number of the latching portions equals a multiple of an even number.

Thirteenth Embodiment

Figure 36A:
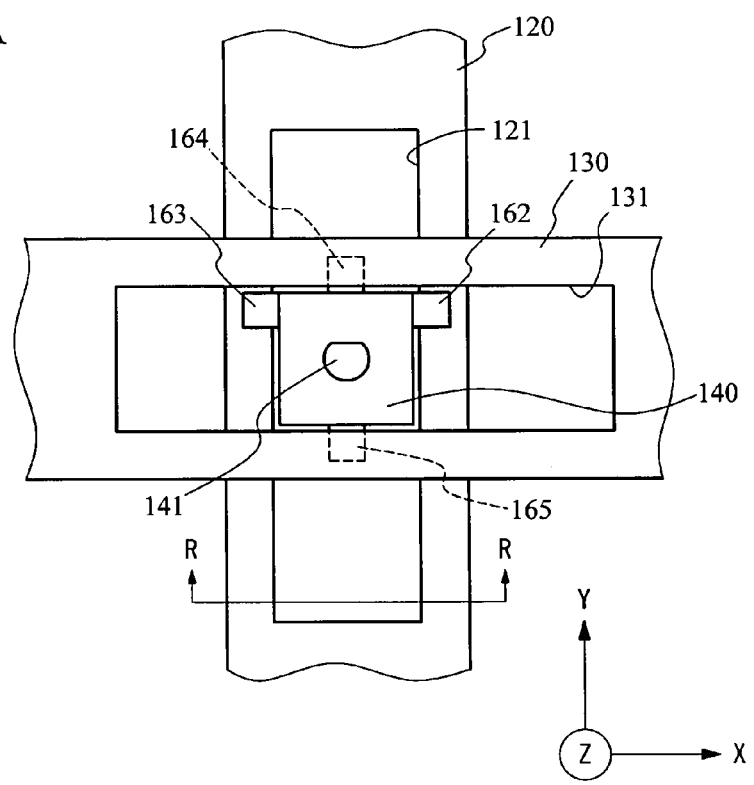
FIGS. 36A and 36B illustrate an operation portion, a first slider and a second slider in accordance with a thirteenth embodiment.
Figure 36B:
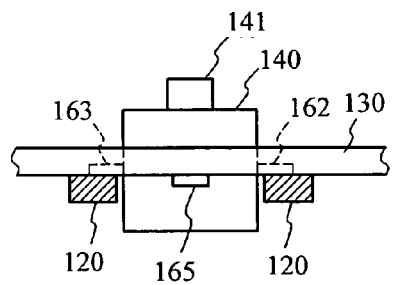

A description will be given of a structure in which the operation portion 140 of the input device N is retained at a fixed position. FIG. 36A and FIG. 36B illustrate the operation portion 140, the first slider 120 and the second slider 130 in accordance with a thirteenth embodiment. Four arms 162 through 165 are provided to project in four directions from the operation portion 140. The first arms 162 and 163 project along an X-axis in both directions, and contact the upper face of the second slider 130. The second arms 164 and 165 project along a Y-axis in both directions, and contact the lower face of the first slider 120. In this structure, the arms 162 through 165 serve as a friction generator and generate a desirable frictional force with the first slider 120 and the second slider 130. This makes it possible to retain the operation portion 140 stably, while the operation is not being done, as in the cases of the other embodiments mentioned above. Further, in this structure, the position of the operation portion 140 is determined in a Z-axis direction vertical to the X-axis and the Y-axis. This also realizes the structure that the operation portion 140 is retained stably in the Z-axis direction. In addition, the arms 162 and 163 are configured to contact the inner wall of the elongate hole 131 of the second slider 130, and it is possible to determine the position of the operation portion 140 accurately because the allowance of the operation portion 140 can be suppressed on a X-Y plane.

Fourteenth Embodiment

Figure 37:
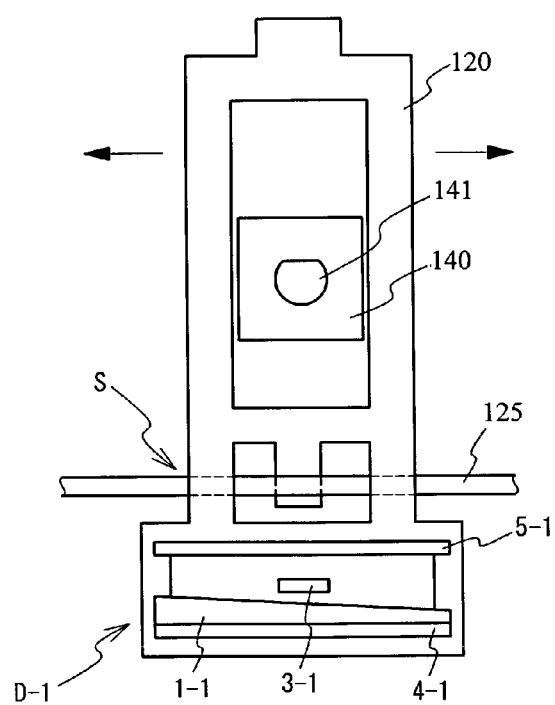
FIG. 37 illustrates a first slider and a sensor portion.
Figure 38E:
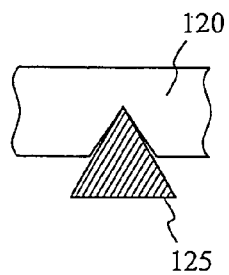

FIG. 37 illustrates the first slider 120 and the sensor portion D-1. In this structure, the magnet 1-1 is arranged outside of the electromagnetic conversion element 3-1. In a case where the guide shaft 125 is formed of a magnetic member such as a metal, it is preferable that the magnet 1-1 should be arranged away from the guide shaft 125 as mentioned above. In FIG. 37, the structure same as that shown in FIGS. 34A and 34B is employed in a portion S and a desirable frictional force is generated between the first slider 120 and the guide shaft 125.

The guide shaft 125 guiding the first slider 120 may be formed of a general member having a rod shape, or may be one of shafts having cross-sectional shapes illustrated in FIG. 38A through FIG. 38E. The same goes for the guide shaft 135 guiding the second slider 130.

Figure 39:
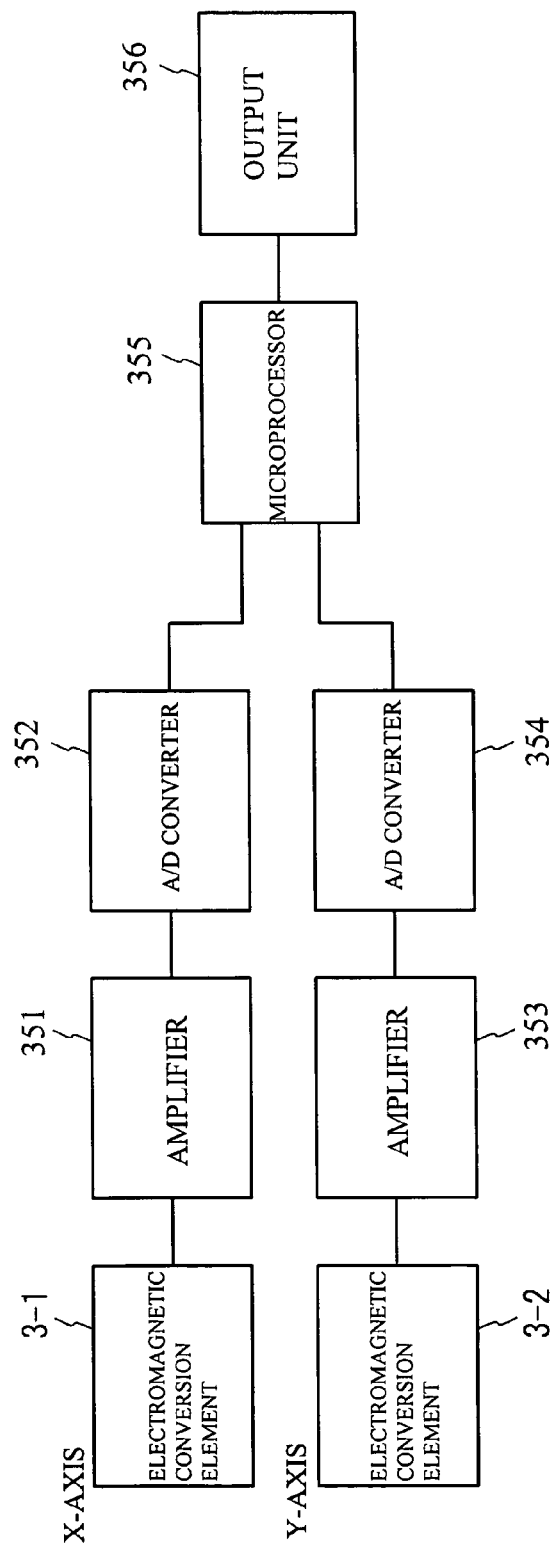
FIG. 39 illustrates a block diagram of electric configuration of an input device.

FIG. 39 illustrates a block diagram of electric configuration of the input device N in accordance with the embodiments mentioned above. The electrical configuration shown in FIG. 39 may be arranged on the board 110 shown in FIG. 12. The electromagnetic conversion element 3-1 detecting a position in the X-axis direction converts the magnetic field intensity into the voltage, and outputs the voltage. An amplifier 351 amplifies the voltage. An A/D converter 352 converts the analog signal amplified by the amplifier 351 into the digital signal. Similarly, the electromagnetic conversion element 3-2 detecting a position in the Y-axis direction converts the magnetic field intensity into the voltage, and outputs the voltage. An amplifier 353 amplifies the voltage and provides the amplified voltage to an A/D converter 354. The A/D converter 354 converts the analog signal into the digital signal.

A microprocessor 355 is mainly constructed of CPU. The microprocessor 355 calculates an X-Y coordinate value based on digital signals from the A/D converter 352 at the X-axis side and from the A/D converter 354 at the Y-axis side. The microprocessor 355 outputs the calculated data into an external device such as a computer through an output unit 356.

While the above description constitutes the preferred embodiments of the present invention, it will be appreciated that the invention is susceptible of modification, variation and change without departing from the proper scope and fair meaning of the accompanying claims.

The present invention is based on Japanese Patent Application No. 2004-345000 filed on Nov. 29, 2004, Japanese Patent Application No. 2005-020613 filed on Jan. 28, 2005, and Japanese Patent Application No. 2005-022320 filed on Jan. 28, 2005, the entire disclosure of which is hereby incorporated by reference.

What is claimed is:

1. A position detection device, comprising:
an electromagnetic conversion element arranged on a given plane and having a first side and a second side;
a rectangular magnetic field generator having a face opposing the first side of the electromagnetic conversion element for generating a magnetic field covering the electromagnetic conversion element,
wherein the rectangular magnetic field generator has a first end and a second end, and a thickness of the rectangular magnetic field generator decreases from the second end to the first end, and a first yoke that is arranged in parallel with the given plane, separated from the rectangular magnetic field generator by an air gap space, having a face opposing the second side of the electromagnetic conversion element, and having a first end and a second end that correspond, respectively, to the first and second ends of the rectangular magnetic field generator, wherein the first yoke is not connected to the rectangular magnetic field generator, wherein the first side of the electromagnetic conversion element directly faces the face of the magnetic field generator with only the air gap space therebetween, and the second side of the electromagnetic conversion element directly faces the face of the yoke with only the air gap space therebetween, wherein the electromagnetic conversion element moves, relative to the opposed face of the rectangular magnetic field generator, straight in the given plane between the first ends and the second ends of the rectangular magnetic field generator and the first yoke without contacting the first yoke or the magnetic field generator, wherein a relative position between the electromagnetic conversion element and the magnetic field generator is detected, when there is a relative displacement between the electromagnetic conversion element and the rectangular magnetic field generator, based on an output signal of the electromagnetic conversion element, and wherein a distance between the face of the rectangular magnetic field generator and the electromagnetic conversion element becomes largest when the electromagnetic conversion element is at the first end of the rectangular magnetic field generator, and becomes smallest when the electromagnetic conversion element is at the second end of the rectangular magnetic field generator.

2. The position detection device as claimed in claim 1, wherein the face of the rectangular magnetic field generator has a plate shape.

3. The position detection device as claimed in claim 1, wherein the face of the first yoke facing the second side of the electromagnetic conversion element is parallel to the given plane.

4. The position detection device as claimed in claim 1, wherein:
the rectangular magnetic field generator has a magnet; and
the magnet has the face of the rectangular magnetic field generator.

5. The position detection device as claimed in claim 1, wherein:
the rectangular magnetic field generator has a magnet and a second yoke, the magnet being arranged between the electromagnetic conversion element and the second yoke of the rectangular magnetic field generator, and the magnet has the face of the rectangular magnetic field generator.

6. The position detection device as claimed in claim 5, wherein:
the magnet and the second yoke of the rectangular magnetic field generator touch each other.

7. The position detection device as claimed in claim 1, further comprising first and second sensors, wherein each sensor includes one of the electromagnetic conversion element and one of the rectangular magnetic field generator, which first and second sensors are respectively arranged on two axes crossed at right angles to each other.

8. The position detection device as claimed in claim 7, wherein a position is detected by calculating a difference between outputs from the two electromagnetic conversion elements, with respect to each axis.

9. The position detection device as claimed in claim 1, wherein the face of the first yoke facing the second side of the electromagnetic conversion element is not parallel to the face of the rectangular magnetic field generator.

* * * * *